Feb. 6, 1962 R. E. WILLIAMS 3,019,975
MIXED-BASE NOTATION FOR COMPUTING MACHINES
Filed July 12, 1957 13 Sheets-Sheet 1

Richard E. Williams
INVENTOR

BY Hyman Hurvitz
W. Robert Baylor
ATTORNEYS

Feb. 6, 1962  R. E. WILLIAMS  3,019,975
MIXED-BASE NOTATION FOR COMPUTING MACHINES
Filed July 12, 1957  13 Sheets-Sheet 2

Richard E. Williams
INVENTOR

BY
Hyman Hurvitz
W. Robert Baylor
ATTORNEYS

Feb. 6, 1962 R. E. WILLIAMS 3,019,975
MIXED-BASE NOTATION FOR COMPUTING MACHINES
Filed July 12, 1957 13 Sheets-Sheet 3

Richard E. Williams
INVENTOR

BY
ATTORNEYS

Feb. 6, 1962 R. E. WILLIAMS 3,019,975
MIXED-BASE NOTATION FOR COMPUTING MACHINES
Filed July 12, 1957 13 Sheets-Sheet 4

Richard E. Williams
INVENTOR

BY

ATTORNEYS

Feb. 6, 1962 R. E. WILLIAMS 3,019,975
MIXED-BASE NOTATION FOR COMPUTING MACHINES
Filed July 12, 1957 13 Sheets-Sheet 7

Richard E. Williams
INVENTOR

BY Hyman Hurvitz
W. Robert Baylor
ATTORNEYS

Feb. 6, 1962  R. E. WILLIAMS  3,019,975
MIXED-BASE NOTATION FOR COMPUTING MACHINES
Filed July 12, 1957  13 Sheets-Sheet 11

| 5,6,7 MIXED BASE | DECIMAL |
|---|---|
| 000 | 0 |
| 111 | 1 |
| 101 | 36 |
| 001 | 120 |
| 010 | 175 |
| 011 | 85 |
| 100 | 126 |
| 110 | 91 |

A

| DECIMAL | 5,6,7 MIXED BASE |
|---|---|
| 000 | 000 |
| 111 | 136 |
| 101 | 135 |
| 001 | 111 |
| 010 | 043 |
| 011 | 154 |
| 100 | 042 |
| 110 | 025 |

B

Richard E. Williams
INVENTOR

BY Hyman Harvitz
W. Robert Baylor
ATTORNEYS

Feb. 6, 1962 R. E. WILLIAMS 3,019,975
MIXED-BASE NOTATION FOR COMPUTING MACHINES
Filed July 12, 1957 13 Sheets-Sheet 12

Richard E. Williams
INVENTOR

BY

ATTORNEYS

Feb. 6, 1962 R. E. WILLIAMS 3,019,975
MIXED-BASE NOTATION FOR COMPUTING MACHINES
Filed July 12, 1957 13 Sheets-Sheet 13

Richard E. Williams
INVENTOR

BY

ATTORNEYS 3,019,975
Patented Feb. 6, 1962

3,019,975
MIXED-BASE NOTATION FOR COMPUTING MACHINES

Richard E. Williams, Fairfax, Va., assignor, by mesne assignments, to Melpar, Inc., Falls Church, Va., a corporation of Delaware
Filed July 12, 1957, Ser. No. 671,662
31 Claims. (Cl. 235—155)

The present invention relates generally to digital computers employing congruence algebra as a basis for its algorithms, and more particularly to digital computers employing mixed base notation, or digital words consisting of residue systems or series of digits rooted, respectively, in different bases or moduli.

Briefly describing the present invention, I define a mixed base digital word as a series of digits rooted each in a different base, as distinguished from the conventional digital word wherein all the digits are rooted in the same base system. It may be shown, if the roots or moduli of the system are relatively prime, that a sequence of digital words may be generated which contains no ambiguities over a range of words equal to the product of the moduli. These words are generated by simultaneously adding units to each order or line of the word, without carry, which leads to techniques for rapid processing in the arithmetic functions, and which requires particularly uncomplicated circuitry or mechanism.

Modern digital computing machines generally employ decimal, binary and binary-decimal number systems, or the like, the present state of the art favoring the binary system for computation because of alleged simplicity of implementation. A binary system involves two states per line, and employs a sufficient number of lines N to yield $2^N$ resolving capability. Since the results of computation are often required to be in decimal notation, binary to decimal and decimal to binary conversion devices are commonly employed. The binary and the decimal system, and combination of these such as the binary decimal system, are typical of common base systems, i.e., systems wherein each digit of a word employs the same base or modulus.

The generalized formula for typical common base numbers is $$N = \Sigma_k A_k M^k$$

The digit A of index K is multiplied by the common base or modulus raised to the power of the index, and the word is a sum of digits. For example, the word 863 $= [8 \times 10^2] + [6 \times 10^1] + [3 \times 10^0]$. We may depart from systems employing a common root, without departing from the summation convention. Such systems in fact employ mixed bases, but any number is represented by the sum of its digits, each digit being expressed to a different base, but the different bases are weighted, therefore carry or borrow operations are required in arithmetical operations.

In accordance with one aspect of the present invention mixed base notation is employed, but there is no columnar weighting, i.e., each column has the same weight, and addition of the number "unity" to a word, in the latter notation, is accomplished by adding "unity" to each line or position of the word.

It can be shown that addition of unity to each of a series of digits rooted in moduli which are relatively prime in pairs yields a series of non-redundant digital words, over a range of values equal to the product of the moduli. A simple illustration of such a system might employ the moduli 3 and 4, which are relatively prime. In such case $12 = 3 \times 4$ numbers may be expressed without redundance, as follows.

SCHEDULE A

| Decimal Notation | Mixed Base Notation | |
|---|---|---|
| | Modulo 3 | Modulo 4 |
| 0 | 0 | 0 |
| 1 | 1 | 1 |
| 2 | 2 | 2 |
| 3 | 0 | 3 |
| 4 | 1 | 0 |
| 5 | 2 | 1 |
| 6 | 0 | 2 |
| 7 | 1 | 3 |
| 8 | 2 | 0 |
| 9 | 0 | 1 |
| 10 | 1 | 2 |
| 11 | 2 | 3 |
| 12 | 0 | 0 |

The general principles of congruence algebra have been understood for a long time, the great mathematician Gauss being the predominating originator of the discipline. Reference is made particularly to "The Elements of the Theory of Algebraic Numbers," by Reid, 1910, published by Edwards Brothers, Inc., for a complete exposition; a brief résumé of the algebra, and of some of the permitted algorithms being herein provided.

CONGRUENCE ALGEBRA

If the difference between two integers $a$ and $b$ be divisible by an integer $m$, $a$, and $b$ are said to be a congruent to each other with respect to the integer $m$, which is called a modulus. This relation is expressed by writing $a \equiv b$ mod $m$. For example, 21 is congruent to 15 mod 3 ($21 \equiv 15$ mod 3) since the difference between 21 and 15, i.e., 6 is integrally divisible by 3.

We can express the fact $a \equiv b$ mod $m$ by writing $a - b = km$ or $a = b + km$, where $k$ is an integer, but the notation $a \equiv b$ mod $m$, which is due to the mathematician Gauss, has the great advantage of placing in evidence the analogy between congruences and equations, and it is found that most of the transformations and algorithms to which equations are subject are also applicable to congruences.

We have, as a direct consequence of the definition of congruences, that if $a \equiv b$ mod $m$ and $b \equiv c$ mod $m$ that $a \equiv c$ mod $m$.

Addition, subtraction, multiplication by an integer and multiplication of congruences are all possible in the theory of congruences. For example, if $a_1 \equiv b_1$ mod $m$ and $a_2 \equiv b_2$ mod $m$, then $a_1 \pm a_2 \equiv b_1 \pm b_2$ mod $m$. If $a \equiv b$ mod $m$, and $c$ is any number, then $ac \equiv bc$ mod $m$; if $a_1 \equiv b_1$ mod $m$ and $a_2 \equiv b_2$ mod $m$, then $a_1 a_2 \equiv b_1 b_2$ mod $m$.

While addition, subtraction and multiplication present no difficulties, and proceed in accordance with the above formulae, the problem of division is not so simple. For example $8 \equiv 14$ modulo 6, but $4 \not\equiv 7$ modulo 6, i.e., the two sides of the congruence cannot be divided by 2 in the case given. In fact, it is found that division of the two sides of a congruence by a common factor is permissible only if the modulus is prime to the division factor. If it is not so prime then not only must the two sides of the congruence be divided but the modulus itself must be divided by the division factor.

A last result of great value may be expressed as follows: If $a$ is congruent to $b$ with respect to each of the moduli $m_1, m_2 \ldots m_n$, then $a$ is congruent to $b$ modulo $1$, where $1$ is the least common multiple of $m_1, m_2 \ldots$. This is especially important where the moduli are prime relative to each other, in which case $1$ is the product of the moduli. For the purpose of providing simple examples of the above theorems, reference is made to the hereinabove provided Schedule A. The schedule shows the numbers from 0 to 11 in the decimal system of notation, there being accordingly 12 decimal numbers. The corresponding numbers in a mixed base system modulo 3 by 4 are also illustrated. The first column is modulo 3 and the second column modulo 4. It is then apparent from the schedule that each decimal number corresponds with a different mixed base number. It may be observed from the table that addition of unity to the decimal column is accompanied by an addition of unity to each of the mixed base columns and this is true regardless of the modulo employed. It may also be observed that addition of any two mixed base numbers provides a third mixed base number which is equivalent in the decimal system to the sum of the original two numbers taken in the decimal system. It may also be observed that any mixed base number may be multiplied in respect to both its columns by a decimal digit, and that the result in the mixed base notation is equivalent to a multiplication of a decimal number by the corresponding multiplier. For example, if we multiply 2×3 in the decimal system, we arrive at the product 6. If we multiply 2–2 in the mixed base system by 0–3, column for column, we arrive at the answer 0–6 which is 0–2 modulo 3 and 4, since $0 \equiv 0$ mod 3 and since $6 \equiv 2$ mod 4. 0–2 equals 6 in decimal notation.

It may further be observed that two mixed base numbers may be multiplied, giving a resultant mixed base number equal to the product of the corresponding decimal numbers. For example, we may multiply 2×3 in the decimal notation, by multiplying 2–2×0–3 in the mixed base notation. This gives a product 0–6, $0 \equiv 0$ mod 3, and $6 \equiv 2$ mod 4, so that again we arrive at a product 0–2 in the mixed base notation, which is equivalent to 6 in the decimal notation.

Certain other elementary facts may be deduced by inspection of the schedule. For example, advance of one of the columns without corresponding advance of the other column corresponds to an addition of $k$ times the modulus of the other column, where $k$ is an integer. For example, the decimal number 4 is 1–0 in 3×4 mixed base notation. Addition of 1 to the first column of the mixed base number provides a new mixed base number 2–0 which is equivalent to 8 and corresponds with 4 plus 4.

Many mathematical operations are readily possible in the mixed base notation which are difficult in other notations, and these will become evident as the description proceeds.

Examination of Schedule A reveals that a mechanical or electrical analog of the left-hand column in mixed base notation, can readily be created by utilizing a ring counter of three states, and the right-hand column through use of a ring counter having four states. The cyclic patterns of the digits within each column are automatically yielded by the rings in their progressive stepping actions, provided both rings are stepped for each addition of unity.

A somewhat more elaborate mixed-base gamut using four relatively prime moduli may involve the moduli 5, 7, 8, and 9. Resolution in this case is equal to one part in 2520=5×7×8×9. The same columnar cyclic ring count process observed in Schedule A (modulo 3 and 4) applies in the quadmodulo case except that in the example shown rings having 5, 7, 8, and 9 states, respectively, are required. Additional relatively prime moduli can be added to the quad-modulo system to yield considerable increases in gamut capacity. A column of modulo 11 can, for example, be added to yield a 27,720 word capacity; and a further addition of a ring of 13 will yield a capacity of 260,360 words. It is thus seen that the mixed-base notation can conveniently be used to yield great variations in machine capacity, varying from the simplest two ring 2×3 code yielding six states, up to capacities of many millions of words obtained through use of 5 or 6 rings with moduli in the order of 9 to 19.

*Arithmetical functioning*

Perhaps the greatest single asset of the mixed-base notation lies in its ability to perform the simpler arithmetical functions such as addition, subtraction, and multiplication, by economical implementation. The economy of implementation results primarily from the elimination of digital carry requirements. Addition of mixed base digits thus consists of merely stepping columnar rings in completely independent fashion by steps equal to the mixed-base digits to be added. The total time required for an addition of two numbers thus is never longer than the time required to step the largest modulo-minus-one present.

Mixed-base subtraction can take the usual form of complementary addition. The complement of a word in mixed-base notation is yielded by subtracting each digit of the word from its respective modulus. This simplified subtraction process may in some cases yield a complementary difference which requires special detection in a mixed-base system. In most cases if the complementary number is an interim step in the computing process, the number will yield no eventual ambiguity, provided that the final result falls in the gamut of true numbers.

In the process of multiplication, once again, the operation is entirely columnar in nature and no carry is required. A typical multiplication operation can be performed through successive additions, and the maximum number of steps required will never exceed the highest modulo-minus-one squared, in accordance with one procedure, or the highest modulo-minus-one in another. Like the other simple arithmetical processes, multiplication is rapidly yielded when mixed-base notation is utilized.

The usual problems of overflow will be observed in a computing machine utilizing mixed-base notation. It is important to note, however, that a number expressed in overflow form will be modulo the machine capacity. Normal operations can thus proceed provided the proper multiple of the machine capacity is added to the result at read-out. The customary "shift" technique of accommodating overflow is someimes difficult to implement in the mixed-base system, as columnar shift requires modular conversion. It is considered generally advisable to use mixed-base notation in those applications where overflow conditions can be reliably predicted in advance and accommodated by suitable subtraction or addition processes. Certain subsidiary devices, such as weighted mixed-base conversion devices, can yield the necessary information; but machine speed is lowered, and complexity added. In general, it will prove more economical to add another modular ring to multiply the capacity of a machine, where additional capacity is required.

*Decimal to mixed-base conversion and vice versa*

In order to convert any decimal number to its mixed-base equivalent, it is merely necessary to divide the decimal number successively by the various moduli of the mixed-base system and express the mixed-base number as the remainders per modulus. For example, the decimal number 1,000 can be expressed in the 5, 7, 8, 9 mixed-base system as follows:

$$a = \text{remainder } \frac{1000}{5} = 0$$

$$b = \text{remainder } \frac{1000}{7} = 6$$

$$c = \text{remainder } \frac{1000}{8} = 0$$

$$d = \text{remainder } \frac{1000}{9} = 1$$

The mixed-base word is thus 0601.

In order to convert a mixed-base word to its decimal equivalent a more involved process is required. Typical steps are as follows for a quadmodulo system, the extension being straight-forward for other modular groups.

(1) Find the decimal equivalents for the words in mixed-base notation 1000, 0100, 0010, and 0001. The first word is known to be an exact multiple of the moduli $m_2$, $m_3$, and $m_4$, since the remainders in each case are 0. It is then merely necessary to discover such a multiple which will in addition yield a remainder of one when divided by the first modulo, $m_1$. The existence of such a multiple is assured by the relatively prime choice of moduli. In the 5, 7, 8, 9, scheme chosen, for example, the lowest common multiple used for the first digit, $a$, is found to be 2,016. (7, 8, and 9 are factors of 2016, and 2016 divided by 5 leaves a remainder of one.) By a similar process the multiples for the remaining digits are found to be 1800, 945, and 280 respectively.

(2) Each expressed digit of the mixed-base word to be evaluated is multiplied by its associated multiple and the entire results summed.

(3) The sum is divided by the product of the moduli to yield a remainder which expresses the decimal equivalent.

For example, to find the decimal equivalent of the mixed-base number 3678 in the 5, 7, 8, 9 mixed-base scheme, it is merely necessary to find the remainder of $2016a + 1800b + 945c + 280d$ upon division by 2520. Substituting three for $a$, six for $b$, etc., and dividing as indicated, it is found that a remainder of 503, the decimal equivalent, results.

It is, accordingly, a primary object of the present invention to provide a system for digital computation, which employs mixed-base numbers, and principles of congruence algebra in its implementation.

It is a further object of the present invention to provide a system for adding two mixed-base words, and for subtracting two mixed base words.

It is a further object of the invention to provide a system for additively or subtractively inserting the content of two mixed-base registers into a third mixed-base register.

It is still another object of the invention to provide a system for decimal counting by means of mixed-base technique.

It is a further object of the invention to provide systems for multiplication of mixed-base members by successive additions, and, in the alternative, by employing algorithms of congruence algebra.

Another object of the present invention resides in the provision of a system for congruence addition or multiplication in a single binary counter, wherein units, tens, hundreds, etc., are added or multiplied in terms of numbers congruent to the units, tens, hundreds, etc., in order to reduce computing time.

It is another object of the present invention to provide methods of matrix addition, subtraction and multiplication of mixed-base numbers.

Still another object of the invention relates to systems for matrix conversion from mixed base numbers to single base numbers, such as, for example, decimal numbers.

A further object of the invention resides in systems for conversion of complex mixed-base numbers to numbers taken to conventional bases, such as decimal or binary.

Still another object of the invention resides in the provision of a system for converting decimal to mixed base notation, in a digital computer.

It is still another object of the present invention to provide a system for converting from weighted digit system to a mixed-base system, by counting down the contents of a register in one number system in terms of simply constructed words, and counting up in another register the equivalents of those words in the other number system.

The above and still further features, objects and advantages of the present invention will become apparent upon consideration of the following detailed disclosure of specific embodiments thereof, especially when taken in conjunction with the accompanying drawings, wherein.

Figure 1:
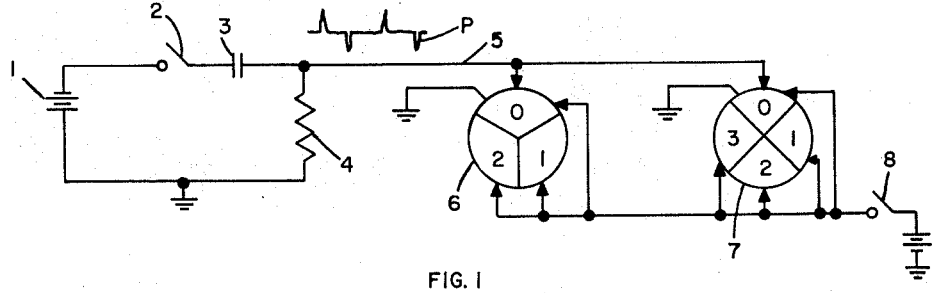
FIGURE 1 illustrates schematically a system for adding single pulses to a mixed-base register, modulo 3, 4.

Referring now more specifically to the accompanying drawings, in FIGURE 1 is illustrated schematically a system for converting a count to a mixed-base word, the initial count being in decimal notation, and the mixed-base word employing the bases 3 and 4, or in mathematical terminology, a base congruent mod 3, 4. A series circuit is provided, comprising seriatim, a voltage source 1, a switch 2, a condenser 3 and a resistance 4. The junction of the voltage source 1 and the resistance 4 is grounded and an output lead 5 derived from the junction of condenser 3 and resistance 4. Accordingly, closure of the switch 2 will result in charging current flowing through the condenser 3. If circuit values are properly selected, charging will be step wise and short pulses of current will flow in resistance 4, corresponding with voltage pulses applied to lead 5. Obviously, other devices may be provided for generating a short pulse current for each closure of a switch, and the specific circuit illustrated and described is intended to be exemplary only, and corresponds to one possible embodiment of a pulse source.

The pulses P applied to lead 5 are applied simultaneously and in parallel to two ring counters 6 and 7, of which counter 6 is mod 3 and counter 7 is mod 4, i.e., ring counters 6 and 7 will repeat after attaining counts of 2 and 3, respectively, starting from zero count. A table showing the settings of counters 6 and 7 for various numbers of input pulses, is as follows:

| Number of Pulses | Setting of Counter 6 Mod 3 | Setting of Counter 7 Mod 4 |
| --- | --- | --- |
| 0 | 0 | 0 |
| 1 | 1 | 1 |
| 2 | 2 | 2 |
| 3 | 0 | 3 |
| 4 | 1 | 0 |
| 5 | 2 | 1 |
| 6 | 0 | 2 |
| 7 | 1 | 3 |
| 8 | 2 | 0 |
| 9 | 0 | 1 |
| 10 | 1 | 2 |
| 11 | 2 | 3 |
| 12 | 0 | 0 |
| 13 | 1 | 1 |
| 14 | 2 | 2 |

By observing the states of counters 6 and 7 following the count, and by reference of the table provided, the combined counter readings may be interpreted decimally, or in terms of number of counts in decimal notation.

Switch 8 serves to reset the ring counter 6, 7, to 00 states, in a manner per se well known, and for that reason not especially described or illustrated.

While the system of FIGURE 1 has a total capacity without redundance of 12 i.e., of the product of the moduli employed, it is sometimes desirable to employ mixed base techniques in a decimal ring counter, i.e., to provide a decimal counter employing rings mod 3 and 4, a carry and reset pulse being provided when the 10 count is attained. Otherwise stated, it is sometimes desirable to provide a count of 10 ring counter, the internal arrangement of which is such that the counter employs mixed-base techniques, in which case the most appropriate moduli to employ would be 3 and 4.

Figure 2:
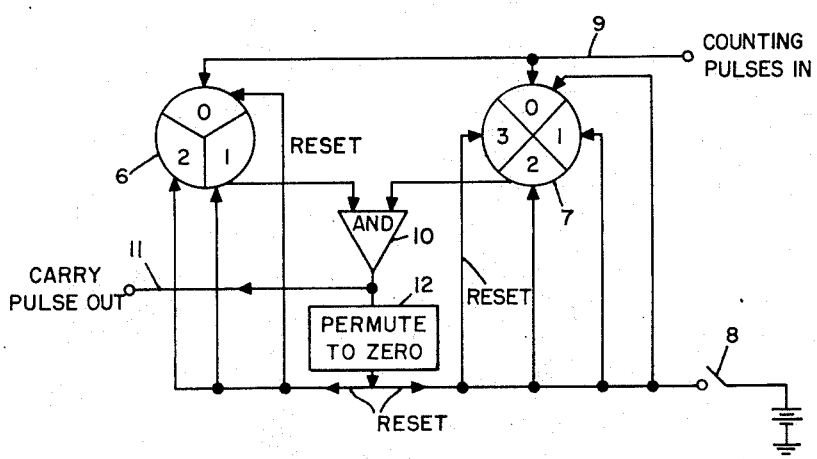
FIGURE 2 illustrates schematically a decimal counter employing two mixed-base rings.

In the system of FIGURE 2, two rings mod 3 and 4 are provided which are identified by the reference numerals 6 and 7 and are arranged to count pulses in parallel, applied via the lead 9. Reference to the above table for a 3 by 4 mixed-base system indicates that "ten" in decimal notation is 1, 2 in the 3×4 mixed-base system.

Accordingly, the "units" output lead of ring 6 and the "two" output lead of ring 7 are applied to an "AND" gate 10 leading to an output lead 11, on which is provided the desired output carry pulses. The output pulses are also applied to a "permute to 0" amplifier 12, which after a suitable delay required to complete the output carry pulses on lead 11, applies reset pulses to counter 6, 7, resetting these to 0 ready for application of further input pulses applied to lead 9. The carry pulses may be applied to further decades to yield any required counting capacity, by cascading.

The system of FIGURE 2 in essence constitutes or is functionally a decimal ring counter, employing mixed-base notation. Such counters may be cascaded, employing the system in which all pulse counters are applied to lead 9, and in which carry exists from one counter to the next of higher decimal order. While such counters have many applications, they require a counting pulse for each event to be registered, and accordingly, where a very large number of events is required to be counted, the read-in time becomes appreciable. Read-in time may be greatly reduced by employing parallel input techniques employing mixed-base decade counters.

Figure 3:
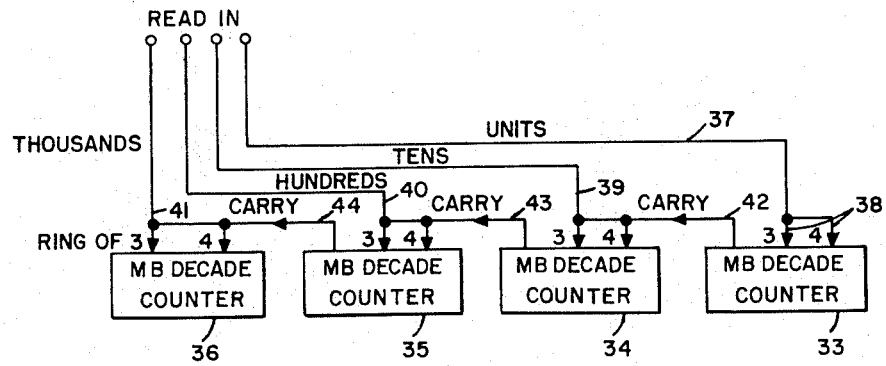
FIGURE 3 illustrates in block diagram a multiple decade register employing mixed-base decade counters.

Referring now more particularly to FIGURE 3 of the accompanying drawings, there is illustrated a series of four decade counters, the units counter of which is identified by the reference numeral 33, the tens counter by the reference numeral 34, the hundreds counter by the reference numeral 35, and the thousands counter by the reference numeral 36. Each of the counters 33, 34, 35, 36 is a counter of the type illustrated in FIGURE 2 of the accompanying drawings, i.e., a decimal counter employing mixed-base techniques, and moduli 3 and 4. The units pulses accordingly are applied over a lead 37 to the counter 33, and as indicated by the double arrows 38 are applied simultaneously to the two rings of the counter. Tens pulses are similarly applied by a lead 39 to the tens decade counter 34, hundreds pulses are applied by a lead 40 to the hundreds decade counter 35 and thousands pulses are applied by a lead 41 to the thousands decade counter 36. It follows that only one pulse is required to insert a count of 1000 into the cascaded units, one pulse is required to insert a count of 100 into the system, one pulse is required to insert a count of 10 into the system and a single pulse inserts single units into the system, in accordance with that one of the leads 37, 39, 40, 41 to which the pulses are applied. A carry pulse lead 42 inserts overage or carry pulses from the counter 33 to the counter 34, a corresponding carry lead 43 applies overage or carry pulses from the counter 34 to the counter 35 and in a similar manner a carry lead 44 applies overage or carry pulses from the counter 35 to the counter 36.

Clearly, if in the counter of FIGURE 2 the "AND" circuit 10 were connected at its two input leads for states 2 and 0 of the rings 6 and 7 respectively, the counter of FIGURE 3 would be a cyclic counter of base 8 and would then operate with respect to a common base 8 numerical read in. Hence, the system may be applied to any desired base and is not limited to decimal notation.

The problem exists in computers of reading a number into a first counter, reading a second number into a second counter and thereafter subtracting the count read in the first counter from the count read into the second counter, or otherwise stated, of reducing the count of the second counter by the count of the first counter.

Figure 4:
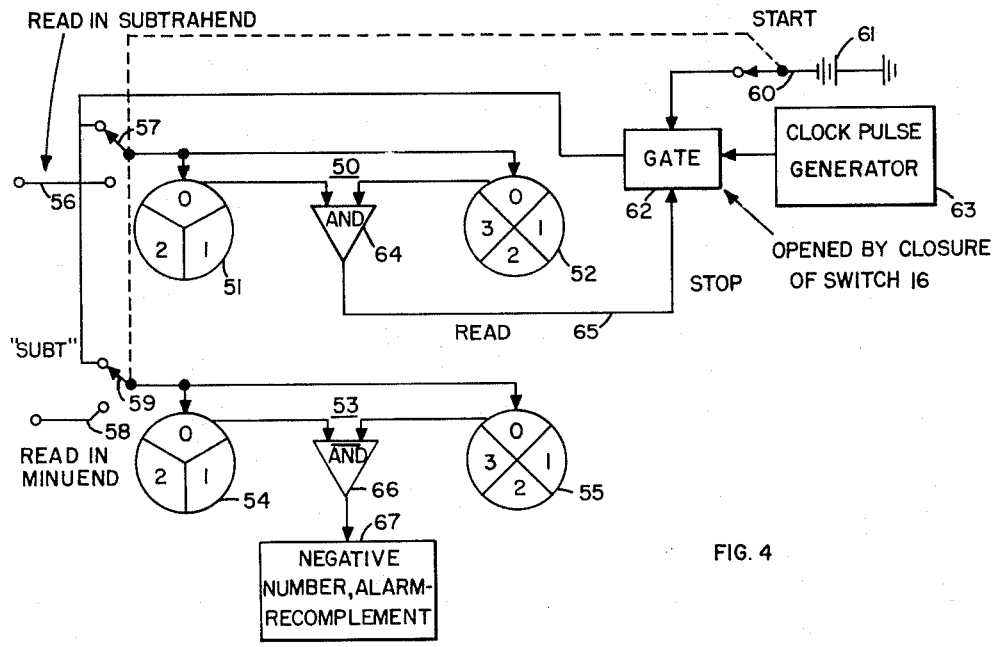
FIGURE 4 illustrates in block diagram a system for subtracting in mixed-base notation.

A system for performing this operation, employing mixed-base techniques, is illustrated in FIGURE 4 of the accompanying drawings.

In the system of FIGURE 4 there is employed a first counter, constituting a subtrahend counter, 50, and employing a modulo 3 ring, 51, and a modulo 4 ring, 52. A minuend counter, 53, similarly employs a modulo 3 ring, 54, and a modulo 4 ring, 55. The moduli 3 and 4 have been selected merely as illustrative, and two rings per counter have been selected for illustration, in order to simplify the exposition. It will be apparent that the principles of the system of FIGURE 4 may be extended to other moduli, and to numbers of moduli other than two.

The lead 56 constitutes a subtrahend read in lead, to which is applied pulses, the number of pulses being of the desired subtrahend. These pulses are applied by switch 57 in its lower position to the counter 50, i.e., to the rings 51 and 52 in parallel. The lead 58 constitutes a minuend read in lead through which pulses to be counted are applied by a switch arm 59, in its lower position, to the counter 53 i.e., to rings 54 and 55 in parallel. When read in has been completed, or at any time thereafter, the switch 60 is closed applying bias voltage from the source 61 to gate 62 and opening the latter. Simultaneously with closure of switch 60, or previously thereto, the switch arms 57 and 59 are thrown to their upper positions. When gate 62 is closed pulses from a clock pulse generator 63 are applied via the gate 62 to the counters 50 and 53 in parallel. The zero position of ring 51 and the zero position of ring 52 are jointly applied to an "AND" gate 64, the output of which appears on a lead 65 and is applied to the gate 62 as a stop signal. Zero position of the ring 54 and zero position of the ring 55 are jointly applied to a "NOT AND" gate 66, which issues into a "negative number alarm" 67 in the form of a suitable indicator, which when actuated, indicates that recomplementation is to take place.

Once two numbers have been inserted in the registers 50 and 53, and the pulses provided by the clock pulse generator 63 fed to the registers 50 and 53, it will be clear that the register 50 will continue to step in response to the clock pulses in an additive direction until its 00 position is reached, at which time the gate 62 will be closed and the stepping of register 50 will terminate. The register 53 will be stepped simultaneously with the register 50, and its stepping action will terminate when the gate 62 is closed. Accordingly, the register 50 comprising counters 51, 52 will terminate action with the count of 00, but the register 53 will in general have some different count than 00 at the termination of the clock pulsing operation.

We may assume, for purpose of explanation only, that the decimal number 6 is the minuend inserted in the the register 53 and the subtrahend 2 is inserted into register 50. On the basis of this assumption, the state of rings 51, 52 is 2-2, while the rings 54, 55 after read-in will read 0-2. Application of clock pulses to the several counters now steps the several counters progressively through their cycles. The register 50 is caused to step back to 00 position. Since the latter started at 2-2 the states through which it will pass are as follows: 0-3, 1-0, 2-1, 0-2, 1-3, 2-0, 0-1, 1-2, 2-3 to state 00. At this point, the "AND" circuit 64 stops the clock pulses. The number of clock pulses which were required was thus ten in number. These clock pulses simultaneously stepped rings 54 and 55 from their initial registration of 0-2 thru 10 successive states to an eventual reading of 1-0.

The reading 1-0 at register 53 corresponds in mixed-base notation with a decimal value of 4, which is in fact the required difference. The "NOT AND" circuit 66 is utilized to detect the passing of mixed-base word 00 in rings 54 and 55, to inform whether the value observed or registered on rings 54 and 55 are in fact, true values, or are complements of the true value. If, for example, the mixed base number 00 is not passed during the subtractive process, the negative number alarm number circuit 67 is energized. This circuit may take the form of a neon bulb, in a simple application of the invention, and indicates that the registered result must be recomplemented. For example, if an attempt were made to subtract four from three, the eight clock pulses which will result would leave a difference of rings 54 and 55 of 2-3 in mixed-based form. This corresponds to the decimal number 11, which should be recomplemented to −1, complementing in the mixed-base form involving merely the noting of the difference between the number to be complemented and the system capacity, which in the instant example is 12.

The system of FIGURE 4 may also be employed to perform the algorithm of addition. In order to add, it is merely necessary to feed the augend into the minuend register 53 and the addend into the subtrahend register 50, the latter, however, in complementary form.

Figure 5:
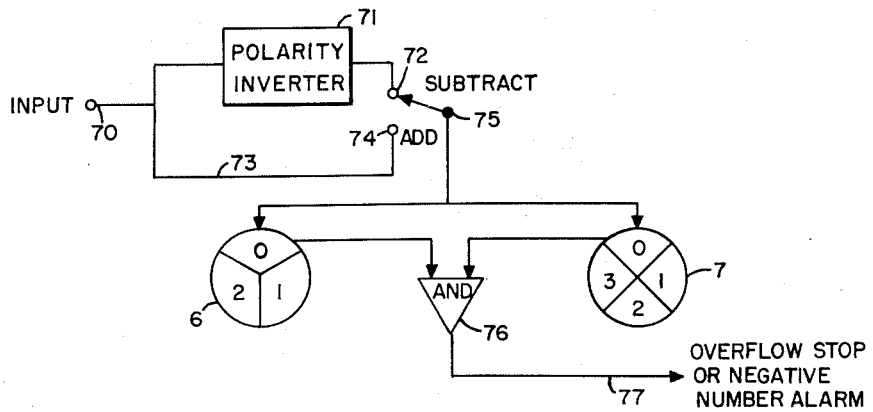
FIGURE 5 illustrates in block diagram a system alternative to that of FIGURE 4 for subtracting a mixed-base notation.

It is well known that ring counters are available, which are able to count in the forward direction upon receipt of positive pulses and in the reverse direction upon receipt of negative pulses. It is essential, in the system of FIGURE 4, that for performing the addition process, either the addend or the augend must be complemented, or reverse coded at some step in the procedure. This may be accomplished by reading in either the addend or augend in complementary fashion, in which case the system of FIGURE 4 will directly yield a sum in the register 53. An alternative technique would be to feed stepping pulses deriving from the gate 62 in inverse polarity to one or the other of the registers, but not to both, in which case the necessary complementary function would automatically result. The techniques which may be employed for a given practical machine may be selected at will by the designer thereof. Having selected a given technique, the negative number alarm 67 will inform the operator when a registered quantity in register 53 must be recomplemented. For example, if a decimal number 5 is to be added to the decimal number 3, reverse stepping of the register 50 after the read-in has been accomplished will allow 5 clock pulses to appear through gate 62, assuming that the subtrahend register 50 started from read-in of 2-0, which is equivalent to the decimal sum 8. In a case of addition as described, the "NOT AND" circuit 66 must be interpreted in opposite fashions of that previously explained i.e., the passing of 00 location in register 53 implies the necessity for recomplementing the sum, and is the opposite for subtraction. Obviously, the alternative expedient implies employing an "AND" gate in place of the "NOT AND" gate 66, giving the indication of the negative number alarm 67, likewise, a corresponding significance.

Where two numbers which are to be added or subtracted one from the other may be made available in sequence, a simpler system than that illustrated in FIGURE 4 of the accompanying drawings may be resorted to. In the system of FIGURE 5 of the accompanying drawings there is indicated a ring 6 modulo 3 and a ring 7 modulo 4, the inputs to which are applied in parallel. A pulse input terminal is indicated at 70. Intermediate the input terminal 70 and the rings 6 and 7 is connected a pulse polarity inverter 71, which issues to a switch terminal 72. A parallel circuit or lead 73 connects the terminal 70 directly with a switch contact 74. Switch contacts 72 and 74 may be selected by means of a switch arm 75, which is in turn connected with the input leads to the rings 6 and 7. When it is desired to add two series of pulses, which are available in sequence, switch arm 75 is placed in its lower or add position and the two series of pulses applied to the input terminal 70. The first series of pulses step the rings 6 and 7 to positions corresponding with the number of pulses of the first series, and the second series arriving after the first series continues the stepping action of the rings 6 and 7. The final position of the latter corresponding with the sum of the pulses. On the other hand, if it is desired to subtract the second series of pulses from the first series of pulses, the switch 75 is placed in its upper or "subtract" position, and the input pulses are applied via the inverter 71 to the rings 6 and 7. The rings 6 and 7 are assumed to be made up of circuit elements of such nature that positive impulses causes each ring to step in one direction, while negative pulses causes each ring to step in the opposite direction. In the latter case the first series of pulses inserts a number into the rings 6, 7 in mixed-base notation, while the second series of pulses reduces that number by the subtrahend required.

The "AND" circuit 76 has its input terminals connected to the 00 positions of the rings 6 and 7, and includes an output lead 77, to which an indicator or other device may be connected. In the case of subtraction, the "AND" indicator may be employed to indicate the need for recomplementation, while in the case of successive additions the "AND" circuit may be employed to indicate that overflow of the mixed-base capacity of the system has taken place.

Were it desired to compare two numbers to determine which is the larger, the first number may be inserted in a additive sense in terms of the number of pulses corresponding with the number, and the second number may be inserted in a subtractive sense in terms of the number of pulses corresponding with the number. In such cases, if the lead 77 is supplied with a signal by the "AND" gate 76, it will be an indication that the second number was the larger. On failure of such an indication, the first number may be known to be the larger.

Figure 6:
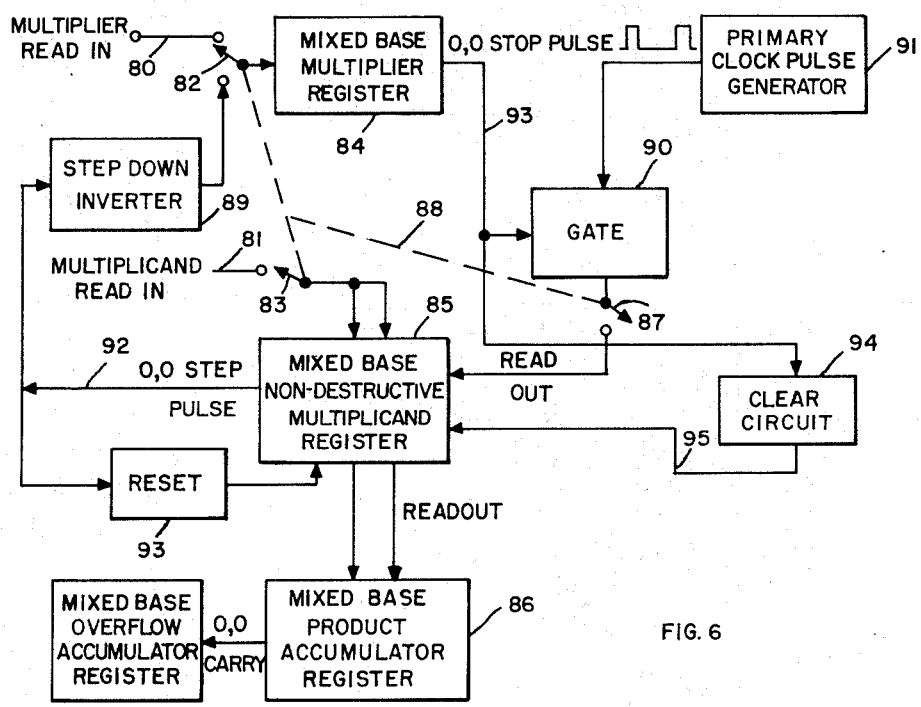
FIGURE 6 illustrates in block diagram a system for multiplying in mixed-base notation.

The systems or arrangements of FIGURES 1 to 5, inclusive, relate entirely to addition and subtraction. One of the important functions of a computer is to multiply two numbers which may have been previously inserted in registers. The process of multiplication is essentially a process of repeated addition. For example, the number 3 may be multiplied by the number 2 by adding the number 3 to the number 3. FIGURE 6 of the accompanying drawings is a block diagram of a system for performing multiplication, employing mixed-base techniques and computing elements, multiplication being performed in terms of repeated additions.

In FIGURE 6, the lead 80 is a multiplier read-in lead, while lead 81 is a multiplicand read-in lead. With switches 82 and 83 in their upper positions, a multiplier may be read in to the mixed-base multiplier register 84 and a multiplicand may similarly be read in to the mixed-base register 85. The fuction of the system is then to multiply the reading of register 84 by the reading of register 85, accumulating the product in a mixed-base product accumulator register 86, on the command "multiply." This command is given when the switch 87, which is normally open, is closed, and the switches 83, 82 are simultaneously placed in their lower positions. Preferably the switches 83, 82, and 87 may be ganged, as by suitable linkage 88. Placing the switch 82 in its lower position connects the input of the mixed-base multiplier register 84 to the output of a step down inverter 89, which serves to convert the polarity of pulses applied to the input thereof prior to application to the register 84, so that pulses applied from the step down inverter 89 to the register 84 will serve to reduce the total amount registered therein. To this end, the register 84 is of the reversible type, which adds in response to pulses of positive polarity and which subtracts in response to pulses of negative polarity. Opening of the switch 83 merely serves to disconnect the register 85 from the multiplicand read-in lead 81. Closure of the switch 87 connects the register 85 to the output of a gate 90. The gate 90 in turn supplies pulses to the register 85 from a primary clock pulse generator 91, while the switch 87 is closed, provided the gate 90 is then open.

The register 85 is the type which is capable of being readout without destroying its contents. Techniques for obtaining nondestructive readout of registers are well known to those skilled in the computer art, and typically involve a localized process of regeneration. Readout pulses are applied to the register 85 from the primary clock pulse generator 91 via the normally open gate 90 in such sense as to cause the reading of the register 85 to return to 0, readings of the register 85 being simultaneously transferred to the register 86 in additive fashion.

As soon as the readout of the contents of the multiplicand register 85 has been accomplished, a suitable "AND GATE" in the register, connected to the 00 positions of the register 85, applies a step pulse to lead 92. The step pulse applied to the lead 92 traverses the reset circuit 93 which causes the register 85 to resume its original reading. Simultaneously the 00 step pulse applied to lead 92 is fed through the step down inverter 89 and through switch 82, now in its lower position, to the mixed base multiplier register 84, reducing the contents of the register 84 by a single step for each complete readout from the multiplicand register 85 to the accumulator register 86.

The readout process continues, repetitively, the original values set into the register 85 being read out into the register 86, the register 85 being then reset to its original reading, and its reading being again readout to register 86. Concurrently, the reading of the mixed-base multiplier register 84 is being reduced by one unit for each complete readout. The process of multiplication by successive additions, as hereinabove described, continues until the mixed-base multiplier register 84 is emptied, at which time it generates a 00 stop pulse, at lead 93, this stop pulse closing the gate 90 and accordingly terminating the multiplicative process. The 00 stop pulse applied to the lead 93 is also applied to the clear circuit 94, which generates clearing pulses for application via lead 95 to the mixed-base nondestructive multiplicand register 85, clearing the latter completely, and conditioning same for a further operation or for insertion of further data therein.

Figure 7:
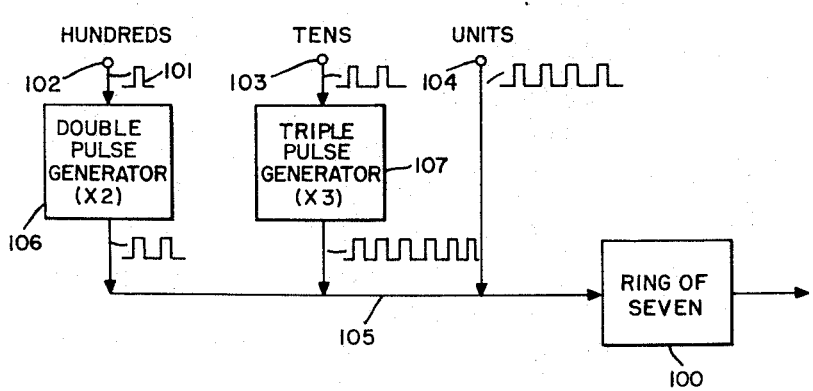
FIGURE 7 illustrates in block diagram a system for inserting large numbers into a ring counter in terms of relatively few pulses, employing principles of congruence algebra.

A problem of primary importance to the construction of computers based on mixed base techniques is that of conversion to mixed base notation from other notations. A most important problem in this respect is the problem of converting from decimal notation to mixed-base notation rapidly, in order to reduce computing time. It will be clear when the total capacity of a mixed-base register is relatively small, that no difficulty is encountered in feeding into the register a number of pulses corresponding with the decimal number to be converted. Each ring of the register is then subjected to all the pulses in the number. However, where extremely large numbers must be handled, this technique is not practical. Attention is directed to a single ring of a mixed-base register. This ring must be subjected to a sufficient number of pulses to attain a final position which is congruent to the desired decimal number modulo the modulus of the ring. For example, consider a ring which has nine positions i.e., a ring modulo 9. Regardless of how many pulses are applied to the ring, the final position of the ring must be one of the nine possible positions. It appears to be totally incongruous to apply a tremendously large number of pulses to a ring counter in order to obtain ultimately a position of the counter which must be one of a very small number of values. A simple device for reducing the total amount of read-in time to a ring is illustrated in FIGURE 7 of the accompanying drawings. For purpose of example only, it is assumed that the decimal number 124 is to be read into a modulo 7 ring. The readout is arranged so that instead of expressing the decimal number 124 as a sequence of 124 clock pulses applied to the modulo 7 ring, the hundreds, tens, and units of the decimal number applied by a separate circuit to the ring, i.e., the ring is fed by decimal columns. It can be shown mathematically that $100 \equiv 2 \mod 7$, i.e., that one hundred divided by 7 leaves a remainder of 2. Similarly, $10 \equiv 3 \mod 7$. If then, for each hundreds unit in a given decimal number, two pulses to be transmitted to a ring of 7, and three pulses for each tens unit, while a single pulse is applied for each unit present in the decimal number, the ring 7 will assume precisely the same position as it would have done had a sequence or series of pulses equal to the decimal number desired to be inserted been applied are by one to the ring of 7. The above recited consequences of congruence algebra are implemented in the system of FIGURE 7.

Referring now more particularly to FIGURE 7 of the accompanying drawings, a ring of 7, identified by the reference numeral 100, is provided, in which is to be inserted a decimal value containing hundreds, tens, and units. A single pulse, as 101, is applied to a terminal 102 for each hundredths unit. Similarly a single pulse is applied to terminal 103 for each tens unit and a single pulse to terminal 104 for each unit in the decimal number. The terminal 102 is connected with an input lead 105 for the ring of 7, 100, by a double pulse generator 106, i.e., a generator which transmits two pulses for each input pulse applied thereto. The terminal 103 is connected to the lead 105 via a triple pulse generator 107 i.e., a pulse generator which transmits three pulses for each input pulse applied thereto. The terminal 104 is directly connected to the lead 105.

Returning to our original example, i.e., the insertion of the number 124 into a modulo 7 register, a single pulse is applied to the terminal 102, two pulses to the terminal 103 and four pulses to the terminal 104. The single pulse supplied to the terminal 102 is translated to two pulses by generator 106 and two pulses are accordingly supplied to the lead 105 and thence to the ring of 7, 100. The two pulses supplied to the terminal 103 are translated into six pulses by the generator 107 and these six pulses are supplied to the ring of 7, 100. The four pulses supplied to the terminal 104 are directly supplied to the ring of 7. Accordingly, the total number of pulses supplied to the ring 100 is 12. $12 \equiv 5$ mod 7, and accordingly the ring of 7 will show a count of 5 which is in turn directly congruent to the decimal number 124 modulo 7.

It will be noted that a total of 12 pulses sufficed to read into the ring of 7 the decimal number 124. Since corresponding techniques may be applied to rings of any desired modulo, by utilizing appropriate pulse generators or pulse multipliers, it will be evident that a register containing any number of rings may be fed in an extremely short time by a relatively short sequence of pulses representative of an extremely large number, and in effect, the total extent of the number to be inserted bears very little relation to the total number of pulses required to insert the number into the several rings.

The technique illustrated in the system of FIGURE 7 of the accompanying drawings leads to certain conclusions with respect to the design of mixed-base computers. For example, if a modulo 11 ring is employed in a register, the hundreds column of a decimal number, since it is congruent to 1 modulo 11, can be fed directly to the ring of 11, i.e., $100 \equiv 1$ mod 11. The tens column is actually congruent to minus 1 modulo 11 ($10 \equiv 1$ mod 11) and thus can be fed directly to the ring 11 through an inverter. The units column of a decimal number obviously must be fed directly to the ring of 11. In fact, the hundreds column advances the ring of 11 one place for each hundredths unit, while the tens column subtracts one from the ring of 11 or steps the ring of 11 backward for each tens unit. In a decimal to mixed-base conversion system, a ring modulo 11 is an extremely valuable and convenient ring to utilize. Similar consequences may be obtained utilizing a ring of ten and a ring of nine, i.e., so long as the moduli of the system are very close to the base of the system from which the conversion is to be effected, the complexity of the system is maintained at an extremely low level. To provide further examples, the decimal number 134 may be inserted in a ring of 11 by inserting 5 forward stepping pulses and 3 reverse stepping pulses. Decimal number 30 would be registered in a ring of 11 by providing three backward stepping pulses.

Obviously, since a ring of ten is congruent modulo 0 to hundreds and tens, in the later case only the units need be entered in the register.

Figure 8:
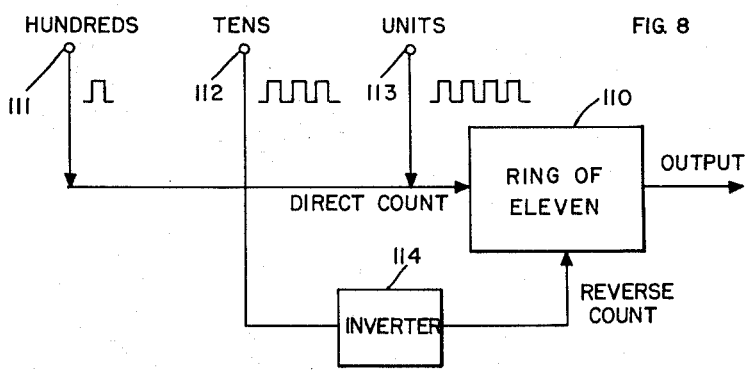
FIGURE 8 is a modification of the system of FIGURE 7, the systems of FIGURES 7 and 8 employing rings congruent to different moduli.

Reference is made to FIGURE 8 of the accompanying drawings for a system for inserting decimal numbers into a ring of 11. The ring of 11 itself is identified by the reference numeral 110. Terminals 111, 112 and 113 are employed for feeding pulses corresponding with the hundreds, tens, and units, of a decimal number respectively to the ring of 11, 110. The hundreds pulses are applied directly from the terminal 111 to the ring of 11, 110, and the units are supplied directly from the terminal 113 to the ring of 11, 110. The tens pulses are supplied from the terminal 112 via an inverter 114 to the ring of 11, 110.

It will be appreciated that both in the system of FIGURE 7 and in the system of FIGURE 8, it is essential that the various pulses supplied in parallel to the rings not overlap in time. This may be readily accomplished by proper design of readout devices, or where the readouts of a series of decimal rings is simultaneous, by introducing adequate delays in the several parallel input channels to the mixed-base ring.

It will also be appreciated that decimal columns of significance 1000; 10,000; 100,000; etc., can be handled in the expeditious manner described. Similarly, where decimal-point significance is involved, such as in computations involving dollars and cents normalization by appropriate powers of ten enable mixed-base computation of columns of significance $\frac{1}{10}$, $\frac{1}{100}$, etc.

Figure 9:
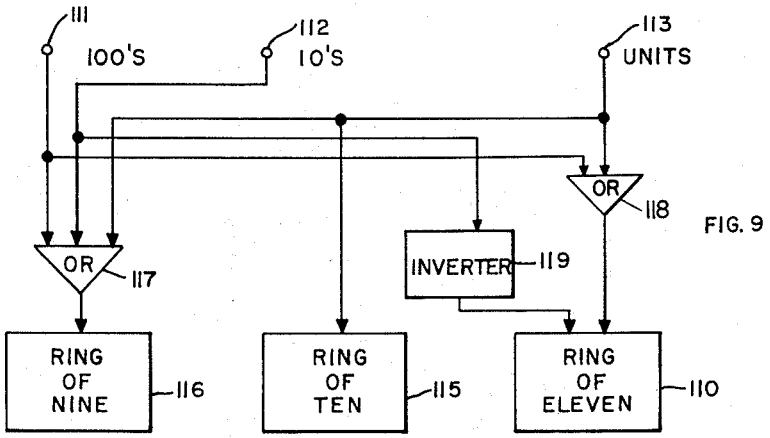
FIGURE 9 is a system for inserting numbers in the decimal system of notation into a mixed-base register, modulo 9, 10, 11.

The system of FIGURE 9 illustrates the application of a mixed-base system, modulo 9, 10 and 11 to conversion of decimal numbers into mixed-base notation.

Hundreds, tens and units pulses are applied, respectively, to terminals 111, 112, 113, sequentially, or otherwise in non-interfering or non-overlapping relation. The unit pulses are applied to ring of 11, 110, to ring of 10, 115, and to ring of 9, 116, since addition of unit to a mixed-base register required addition of unity to each counter or ring thereof. Application to ring 116 is via OR gate 117.

Since $10 \equiv 0$ mod 10, and $100 \equiv 0$ mod 10, no pulses need be inserted into the ring of ten 115, for counts of 10 or 100.

Since $10 \equiv -1$ mod 11, and $100 \equiv +1$ mod 11, it is required to subtract one pulse from ring 110 for each count of 10, add a pulse to ring 116 for each count of 100 and add a pulse to each of rings 110 and 116 for each count of 100. Accordingly, terminals 111 and 113 are connected via an OR gate 118 to ring of 11, 110. Since $10 \equiv 1$ mod 9, and $100 \equiv 1$ mod 9, terminals 111 and 112 are connected to OR gate 117, and thence to ring of 9, 116.

Figure 10:
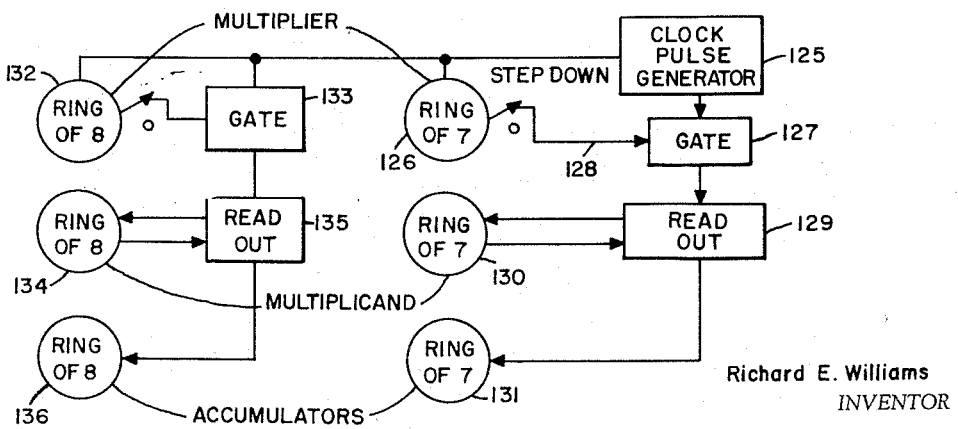
FIGURE 10 is a block diagram of a system for congruence multiplication of mixed-base numbers.

In the system of FIGURE 10 is illustrated one type of multiplication of two numbers set into rings of a mixed-base system. For clarity of presentation, and to avoid duplication, the system is shown as applied to a bi-modulo system, the extension to a tri-modulo system being then obvious, and requiring merely duplication of the equipment employed for bi-modulo multiplication.

A clock 125 provides step-down pulses to a first ring of seven 126. For each clock pulse the ring of seven 126 steps back one place, until a zero reading is attained when a closure pulse is applied to a bi-stable gate 127 via lead 128.

Pulses are passed by gate 127, while open, to a read-out device 129, which reads out the setting of ring 130 which is a ring counter modulo 7, into an accumulator ring of 7, 131, by non-destructive read-out.

Successive read-outs occur from ring 130 into ring 131, for a number of times adequate to step ring 126 back to zero, when closure of gate 127 stops the process of accumulation.

Similarly, step down pulses are applied from clock pulse generator 125 to a ring of 8, 132, which, on attaining count of zero, closes a normally open gate 133. Each clock pulse, while gate 133 is open, effects a non-destructive read-out of ring of 8, 134, by energizing read-out device 135, which transfers the read-out to accumulator ring of seven, 131 and ring of eight, 136.

There is thus inserted into ring of seven, 131, and ring of 8, 136, respectively the product of the readings of rings of 7, 126, and 130, and rings of 8, 132, 134, respectively, in all cases to the proper modulus. It can then be shown, by congruence algebra, that the readings of rings 131 and 136, represent products in mixed base notation, of the readings of rings $132 \times 134$ and $126 \times 130$, respectively. The congruence algorithm involved is, that if $a \equiv b$ mod $m$, and $c \equiv d$ mod $m$, then $ac \equiv bd$ mod $m$.

MATRIX ADDITION

The algorithm involving congruences, and hence mixed-base computation, permit the increase of computer speed by means of matrices. For purpose of example only, matrix addition of two rings, modulo 3, is illustrated and described, i.e., it is assumed that a residue modulo 3 has been inserted in one ring of 3, and another residue modulo 3 has been inserted in another ring of 3, and that the contents of the rings are to be added.

The algorithm of addition may be plotted as follows:

|   +   | 0 | 1 | 2 |
|-------|---|---|---|
| 0     | 0 | 1 | 2 |
| 1     | 1 | 2 | 0 |
| 2     | 2 | 0 | 1 |

Figure 11:
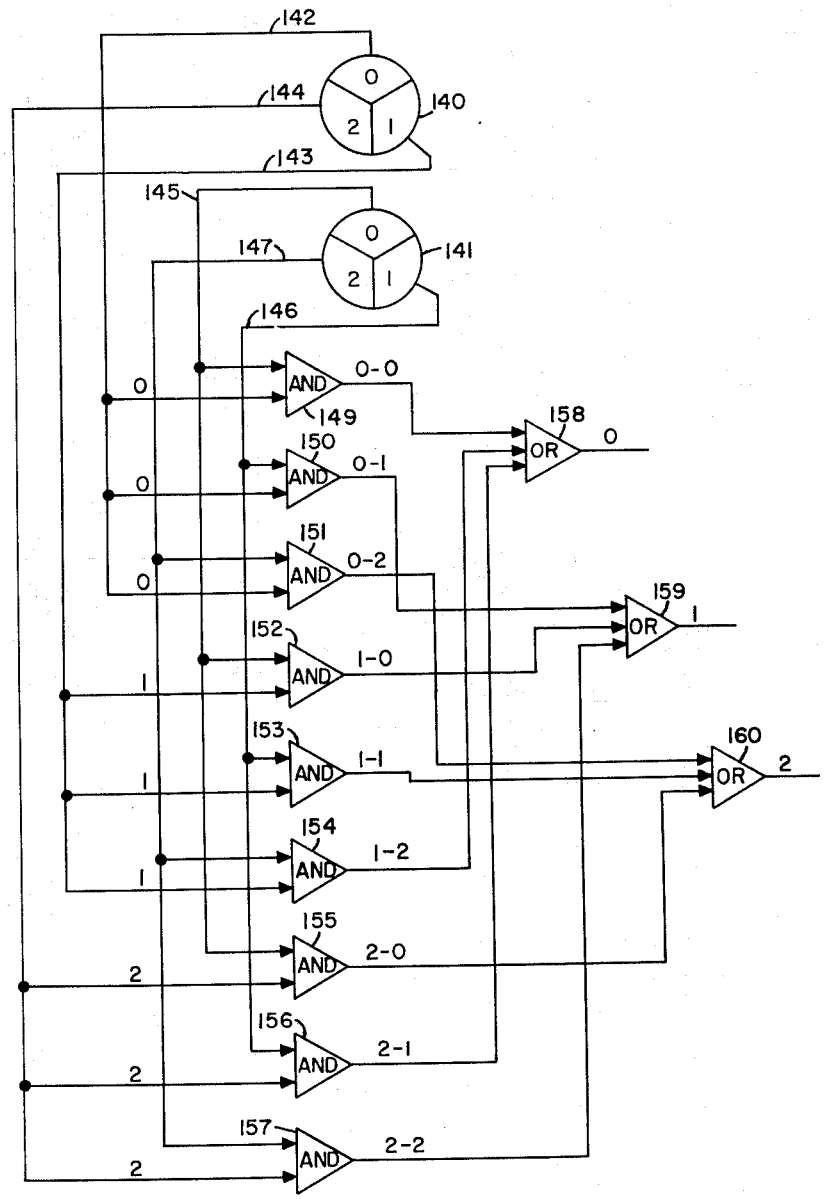
FIGURE 11 is a block diagram of an additive matrix, employing mixed-base notation.

In FIGURE 11 of the accompanying drawings, the reference numerals 140 and 141 represent, schematically, two rings of three, which may be mechanical or electronic ring counters. Leads 142, 143, 144 derive from the three positions of ring 140, and these leads may thus be selectively energized, according as ring 140 reads 0, 1, or 2. Similarly, leads 145, 146, and 147 derive from the three positions of ring 141, and may be selectively energized according as ring 141 reads 0, 1, or 2.

Lead 142 proceeds to three "AND" gates, 149, 150, 151 in parallel. Lead 143 proceeds to "AND" gates 152, 153, 154 in parallel, and lead 144 proceeds in parallel to "AND" gates 155, 156 and 157, in parallel.

Lead 145 proceeds to "AND" gates 149, 152, and 155, lead 146 to "AND" gates 150, 153 and 156; and lead 147 to "AND" gates 151, 154 and 157. There are thus nine "AND" gates, representing every possible combination of readings of rings 140, 141. The total possible number of residues mod 3 is, however, 3, i.e., 0, 1, 2, according to the above table.

The outputs of "AND" gates 149, 154, 156 proceed to an "OR" gate 158, the outputs of "AND" gates 150, 152 and 157 to "OR" gate 159 and the outputs of "AND" gates 151, 153 and 155 to "OR" gate 160. The one energized output lead deriving from the three "OR" gates then represents the sum of the values set into rings 120, 131, modulo 3.

While the use of matrix methods leads to rapid addition, the total number of gates required for high moduli is undesirable. Boolean decomposition may, however, be employed to simplify the gating problem, pursuant to known techniques. See Arithmetic Operation in Digital Computers by R. K. Richards, published by Van Nostrand, Inc., 1955, chapter 2.

Figure 12:
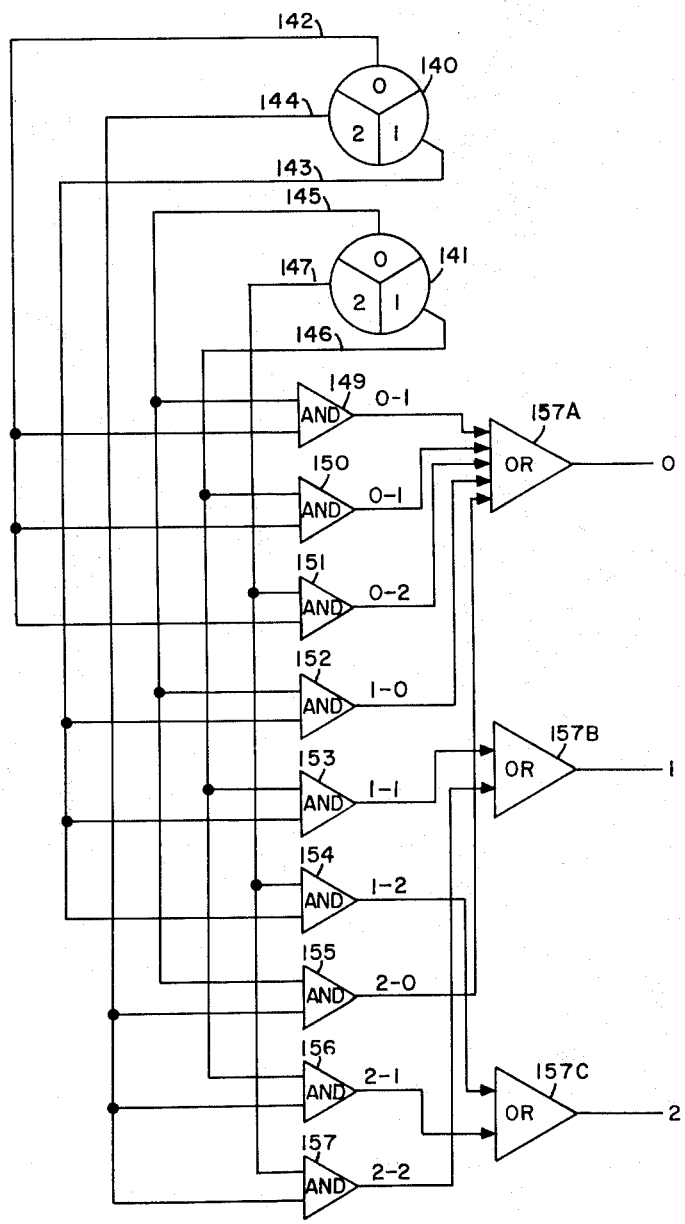
FIGURE 12 is a block diagram of a multiplicative matrix, employing mixed-base notation.

The system of FIGURE 12 duplicates the system of FIGURE 11 except for the arrangement of the "OR" gates which leads to multiplication in place of addition. The system of FIGURE 12 employs "OR" gates 157A, B, and C. The leads deriving from the "AND" gates in FIGURES 11 and 12 have been identified in the terms of the two mixed-base values which are associated by means of the "AND" gates. Leads then proceed to the "OR" gates on the basis that the leads 0–1, 0–1, 0–2, 1–0 and 2–0 proceed to the "OR" gate 157A, the leads 1–1 and 2–2 proceed to the "OR" gate 157B and that leads 1–2 and 2–1 proceed to the "OR" gate 157C. The desired end result is multiplication, it being obvious that whenever 0 appears in one of the mixed-base numbers, the product of the two must be zero, and correspondingly the output of the "OR" gate 157A must represent a zero. Similarly, the "OR" gate 157B represents the product of 1×1, which is 1, while the product of 2×2 is 1 modulo 3. Accordingly, the output of the "OR" gate 157B represents a 1. The "OR" gate 157C is supplied with the numbers 1–2 and 2–1, both of which are congruent to 2 modulo 3, so that the output of this gate represents a 2.

Figure 13:
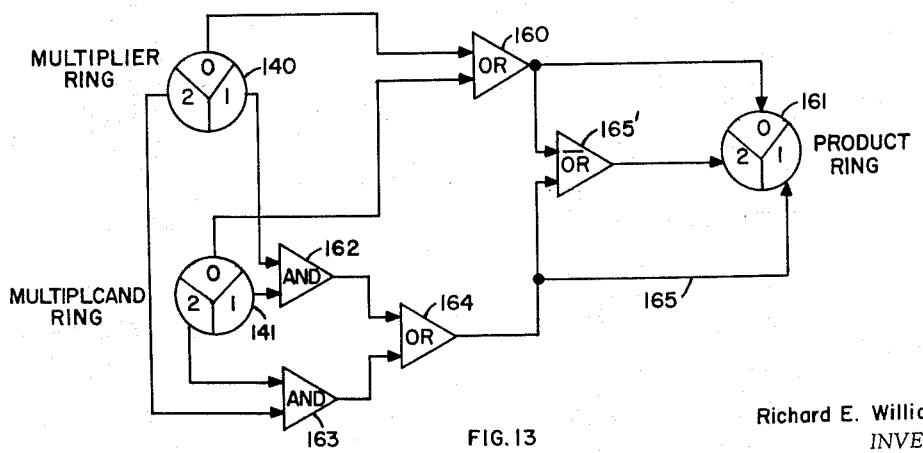
FIGURE 13 is a block diagram of a system of multiplication employing matrix techniques, for numbers expressed in mixed-base notation.

It can be shown that the total number of gates employed in the system of FIGURE 12 can be reduced, by Boolean decomposition. Reference is made to FIGURE 13 of the accompanying drawings for a system for multiplying two numbers modulo 3, and employing a minimum number of gates. In the system of FIGURE 13 the multiplier and multiplicand ring counters are denominated 140 and 141, as in the system of FIGURE 12. The two zero positions of the ring counters 140 and 141 proceed to an "OR" gate 160, the output of which in turn proceeds to a zero position of a product ring 161. This indicates that whenever a zero occurs in either of the rings 140 and 141 a zero should be set up in the product counter 161. Positions 1 and 1 of the rings 140 and 141, respectively, proceed to an "AND" gate 162, and a signal appears at the output of this "AND" gate, accordingly, whenever the numbers 1 and 1 appear on the rings 140 and 141. Similarly, the positions 2-2 of the rings 140 and 141, respectively, proceed to an "AND" gate 163. The outputs of the "AND" gates 162 and 163 proceed to an "OR" gate 164, and the output of the latter proceeds via lead 165 to the unity position of the product ring 161. The logic of this procedure is that 1×1 is 1 modulo 3 but that 2×2 is also 1 modulo 3. The output of the "OR" gates 160 and 164 proceed to a "NOT OR" gate 165' and the latter then proceeds to the 2 position of the product ring 161. The last procedure is indicated by the fact that if neither of two states of a ring of three are actively excited, the signal must be assumed to lie in the third remaining state. If there is no signal out of gate 160 and no signal out of gate 164, the conclusion is inescapable that the product is 2.

Figure 14:
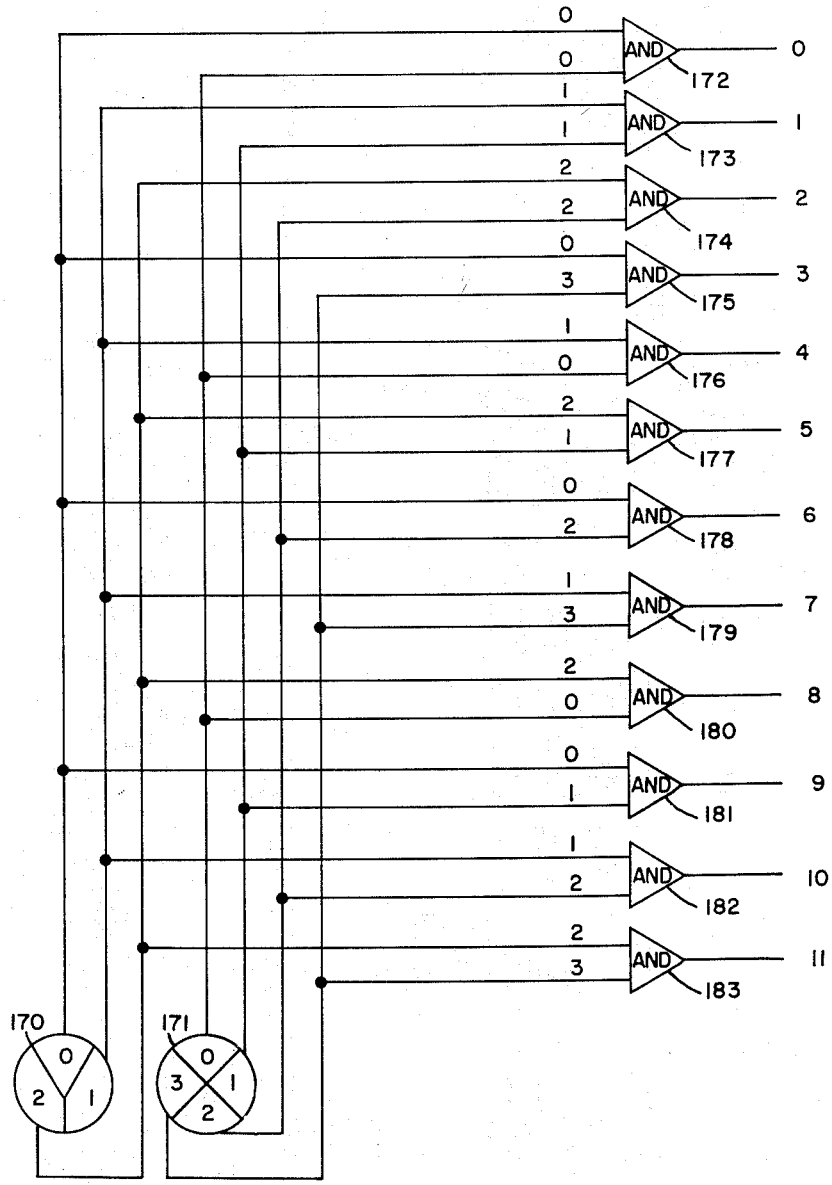
FIGURE 14 is a block diagram of a mixed-base to decimal conversion system employing matrix techniques.

The system of FIGURE 14 relates to a matricing procedure for combining outputs of a ring of three with a ring of four, providing essentially a new ring, which is no longer in mixed-base notation. For example, the ring of three and the ring of four may provide an output to a ring of 12, or if desired to some lesser number such as 10, since any lesser number is inherent in the 12 outputs from the system of FIGURE 4. It follows that conversion from mixed-base to decimal notation is inherent in the system of FIGURE 14.

In the system of FIGURE 14 a ring of 3 may be denoted by the reference numeral 170 and a ring 4 by the reference numeral 171. A series of twelve "AND" gates is provided, denoted by reference numerals 172, 173, 174, 175, 176, 177, 178, 179, 180, 181, 182, and 183, respectively. The leads from the various positions of the rings 170 and 171 proceed to these "AND" gates, and leads proceeding to the input of any "AND" gate are identified in the drawings by a pair of numerals in mixed-base notation, these numerals corresponding with the settings of the rings 170 and 171. For example, the "AND" gate 172 shows the notation zero-zero, and accordingly it may be understood that the "AND" gate 172 is connected to 0–0 positions of the rings 170 and 171, respectively. The outputs of the "AND" gates, on this basis, correspond with numbers in the decimal system proceeding from zero to twelve. By disabling the 10 and 11 positions, i.e. the "AND" gates 182 and 183, the maximum readout corresponds to nine, so that the system may be employed for converting from mixed-base modulo 3–4 to decimal numbers.

Figure 15:
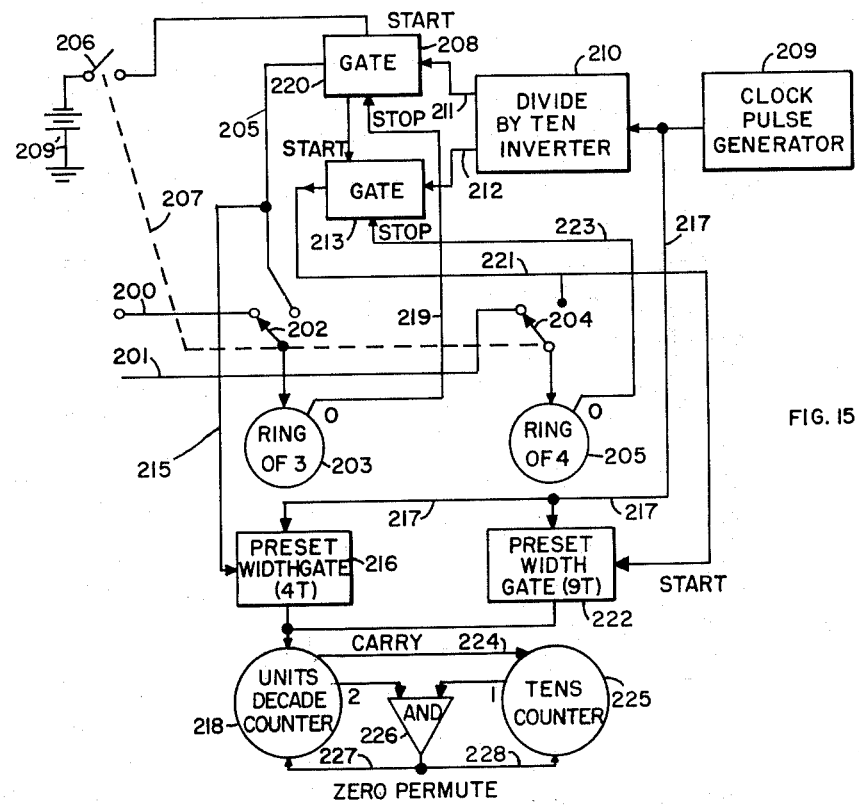
FIGURE 15 is a block diagram of a system for converting mixed-base words to decimal words by a process of counting down in terms of significant mixed-base words.

While the system of converting from mixed-base to single base systems and notation, employing matrices, and following the general teachings of FIGURE 4 of the accompanying drawings, is effective, in the case of multi-modulo systems the matrix which is required can become quite complex, especially where the computer is very large. Systems have accordingly been devised for converting from mixed base to decimal notation, which are applicable to computers of extremely large capacity. Reference is made to FIGURE 15 of the accompanying drawings for one such system.

In FIGURE 15 is provided two input terminals 200 and 201. The terminal 200 proceeds via a switch 202 (in its left-position) to a ring of three 203. The terminal 201 proceeds via a switch 204 (in its left position) to a ring of four 205. Accordingly, input pulses may be applied to the terminals 200 and 201, and in response thereto the rings of three and four may be stepped to some predetermined value. It is then desired to convert the value set into the rings of three and four into a decimal register. To this end the switches 202 and 204 are set into their right position, and concurrently therewith the switches 206, ganged with the switches 202, 204 by means of linkage 207, connects a normally closed gate 208 to a voltage source 299', in consequence of which the normally closed gate 208 becomes open.

Clock-pulse generator 209 is provided, which supplies pulses via a divide-by-ten inverter 210 to two output leads 211 and 212. The function of the inverter 210 is to divide the number of the pulses provided by the clock-pulse generator 209 by the factor 10 and simultaneously to invert their polarities. The lead 211 proceeds to the now open gate 208, while the lead 212 proceeds to the normally closed gate 213. Clock-pulses pass through the gate 208, and proceed to count down the ring of three 203. Since the gate 213 is closed these clock-pulses cannot proceed to the ring of four 205, and the latter remains unactuated.

The output of gate 208 proceeds via a lead 215 to a preset width gate 216, which in response to each control pulse supplied thereto by lead 215 opens for a time equal to four consecutive pulses from the clock-pulse generator 209, which arrive at preset width gate 216 via lead 217. These pulses are passed by the preset width gate 216 and applied to a units decade counter 218, which adds these pulses. Accordingly, for each unit count down of the ring of three, 203, while the ring of four 205 remains unchanged, a total of four counts is inserted in the units decade counter 218. When the ring of 3, 203 has counted back to zero, a stop pulse is applied therefrom to the gate 208 via lead 219.

Upon closure of gate 208 a trailing edge pulse is transmitted through lead 220 to the gate 213, and opens the latter to admit further pulses deriving from the divide by 10 inverter 210 to a lead 221. The latter supplies start pulses to a preset width gate 222, the output of which proceeds to the unit decade counter 218. Present width gate 222 is so set as to pass nine clock-pulses from generator 209 via lead 217 to the unit decade counter 218 while the gate 213 supplies count-down pulses via lead 221 to the ring of four 205. The latter counts down until its reading is zero, at which time a stop pulse is transmitted to gate 213 via lead 223. The cycle is now complete. To the extent that units decade counter 218 is supplied with a count of more than 9, a carry pulse is transferred over a lead 224 to tens counter 225.

The "two" position of the units decade counter 218 and the "units" position of the tens counter 225 are jointly applied to an "AND" gate 226, the output of which is applied via leads 227, 228 to the counters 218 and 225, to cause them to commute to zero and thereafter to continue their counts. The latter step is necessary since the total count permitted by the mixed-base register, being modulo 3–4, cannot exceed 12 without a repetition.

As an example of the arithmetic operations involved in the system of FIGURE 15, it may be assumed that the decimal number to be transferred is 5. In such case the ring of three commences the operation with an indication of 2 and the ring of four commences the operation with indication of 1. Since the ring of three, in effect, produces four counts for each step from zero the count-down process of the ring of three produces eight pulses into the units decade counter 218. The ring of four in counting down produces a total of 9 pulses per count at the units decade counter 218. The total count of the units decade counter 218 is thus 8+9 or 17 counts. Since the decimal register consisting of the units decade counter 218 and the tens counter 225 is permuted to zero through "AND" circuit 226 on a count of 12, 17 input pulses will leave a residue of five counts, in the decade register, which is the correct answer. The "AND" gate, 226, in effect, changes the decimal register into a counter modulo 12, which is the same as the combined moduli of the ring of three and the ring of four, and hence converts a count of more than 12 to the correct value.

The mathematical logic behind the mixed-base to decimal conversion exemplified in this system of FIGURE 15 is that for every step of the ring of three while the ring four remains quiescent, the decimal equivalent of four counts is being read into a decimal counter, while each step of the ring of four while the ring of three remains quiescent is equivalent to nine decimal counts as may be seen by reference to the provided schedule for 3×4 mixed-base systems.

The system of FIGURE 15 may obviously be extended to any mixed-base system. For example, in a mixed base system employing four moduli the mixed-base words of importance would be 1000, 0100, 0010, 0001. For given moduli, the additive values of these mixed-base numbers can be determined, and it is then necessary merely to feed into the decimal read-out device a preset decimal word corresponding to each of the significant words as these are counted down sequentially.

Figure 16:
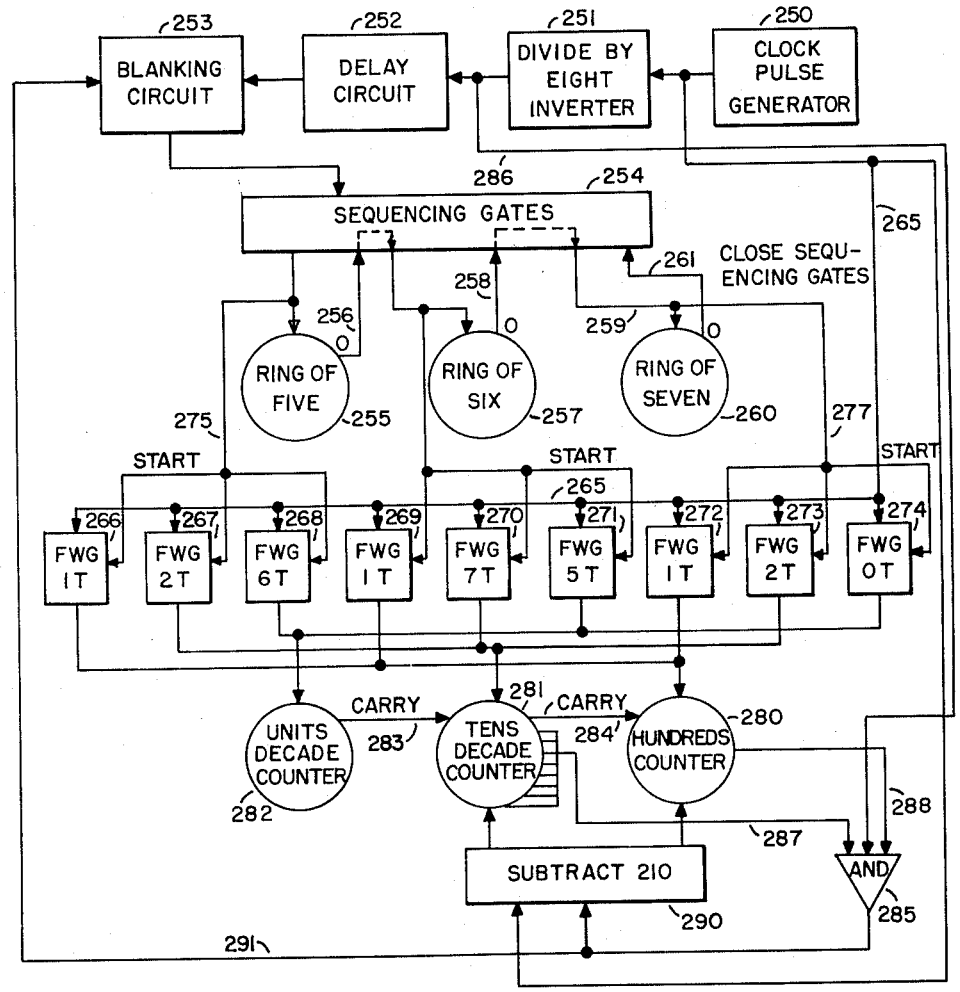
FIGURE 16 is a block diagram of a modification of the system of FIGURE 15, arranged for a tri-modulo system.

In the system of FIGURE 16 of the accompanying drawings is illustrated an extension of the system of FIGURE 15 applied to a tri-modulo system. In the system of FIGURE 16 is provided a clock-pulse generator 250, which is connected to a divide by eight inverter 251, the function of which is to transmit one pulse for each eight clock pulses transmitted to it, and to provide that one pulse in polarity inverted relation. The pulses provided by the divide by eight inverter 251 proceed via a delay circuit 252 and a normally open blanking or gating circuit 253 to sequencing gates 254. The latter constitutes three sequential gates, the first of which may be opened as a command when a conversion from mixed-base to decimal notation is initiated. The first sequencing gate proceeds to a ring of five 255, which on attaining a zero position, provides a control pulse to a lead 256, that control pulse switching the sequencing gate, so that succeeding pulses passing through the sequencing gates arrive only at the ring of six 257. When the ring 257 attains a zero count, it provides a control pulse via a lead 258 to sequencing gate 254, so that all succeeding pulses proceed via lead 259 to a ring of seven 260. When the ring of seven 260 attains a count of zero, a stop pulse is applied via lead 261 to the sequencing gates 254 and closes all of these.

Provision has, accordingly, been made for counting down to zero the rings of five, six and seven, in sequence, and one count down for any ring occurs for each eight clock pulses provided by the clock pulse generator 250.

The clock pulses themselves proceed via a lead 265 to a series of fixed width gates, all in parallel, and identified by the reference numerals 266, 267, 268, 269, 270, 271, 272, 273, and 274, respectively. There are nine fixed width gates, three of which are associated with the ring of five 255, three of which are associated with the ring of six 257 and three of which are associated with the ring of seven 260. More specifically, for each count-down pulse applied to the ring of five 255 from the sequencing gate 254, a control pulse is applied via a lead 275 to the fixed width gates 266, 267, and 268, opening each of these for a predetermined time, or for a time adequate to pass a predetermined number of clock pulses supplied over the lead 265. In similar fashion the fixed width gates 269, 270, and 271 are controlled from the sequencing gate which it supplies count-down pulses to the ring of six 257, via a lead 276, and the fixed width gates 272, 273, and 274 are supplied with control pulses via a lead 277 from the sequencing gate section which supplies count-down pulses to the ring of seven 260. Each of the fixed width gates is designed to provide a gate of suitable length for the operation required of it, in accordance with a philosophy which will be explained hereinafter. The outputs of the gates 266, 269 and 272 are applied in parallel to a hundreds counter of a decimal register 280. The outputs of the fixed width gates 267, 270, and 273 are similarly applied to a tens decade counter 281 while the outputs of the gate 268, 271, and 274 are applied to a units decade counter 282.

The units, tens, and hundredths decade counters 282, 281, and 280, respectively, are interconnected by means of carry circuits 283 and 284, respectively, so that the total number of clock pulses which pass through all the fixed width gates are effectively totaled.

For each count in the ring of five 255, one pulse is sent to the hundreds counter 280 via fixed width gate 288, two pulses are sent via fixed width gate 267 to the tens counter 281 and six pulses are sent via fixed width gate 268 to the units counter 288. It is thus the case that for every step down of the ring of five 255 the decimal word 126 is fed in essentially parallel form to the decade register comprising the counters 282, 281, and 280. The decimal number 126 was derived by evaluating the mixed base number 100, in the modulus system 5, 6, 7. When the ring of five has stepped to zero, the sequencing gates 254 proceed to apply count down pulses for counting the ring of six to zero. In this process the decimal number 175 is fed into the decimal counter by gates 269, 270, and 271. Similarly the ring of seven is unloaded through fixed width gates 272, 273, and 274, which produce a decimal count of 120 for each step of the mixed-base ring 260.

Following through an exemplary operation, it is assumed that the mixed-base rings of 5, 6, and 7 initially contain the mixed-base number 213. This number in mixed-base notation can be shown to correspond to 157 in decimal notation. During the transfer process, the ring of five will feed two counts of 126 into the decimal register, the ring of six will feed one count of 175 into the decimal register and the ring of seven will feed three counts of 120 into the decimal register. The sum of all the decimal numbers fed into the decimal register is thus 787. The limit of the system modulo 5, 6, and 7 is however 210, i.e., the product of the moduli. It is, therefore, necessary to permute the decimal register comprising the units decade counter 282, the tens decade counter 281 and the hundredths counter 280. In such manner the result is always provided within the range 0 to 210. This is done by means of "AND" circuit 285.

The operation of "AND" circuit 285 is as follows. Just prior to transmission of a step pulse to any of the mixed-base rings 255, 257, and 260, the stepping pulse at the output of divide by 8 inverter 251 is fed to the "AND" circuit 285 via lead 286. Lead 286 derives directly from divide by eight inverter 251, and precedes the delay circuit 252. Whereby the "AND" circuit 285 is capable of operating prior to the stepping of any of the mixed-base rings 255, 257, and 260. The "AND" circuit 285 also has the input lead 287, which is energized whenever the reading on the tens decade counter 281 is in excess of one. Still another input to the "AND" circuit 285 consists of the lead 288 which is energized whenever the reading on the hundreds counter 280 is in excess of two. Simultaneous signals at leads 286, 287, and 288 energize the output of the "AND" circuit 285 to trigger a "subtract 210" circuit 290, which reduces the reading of the decimal counters 281 and 280 by a value of 210, i.e., to a reading of less than 210. Simultaneously, the output from the "AND" circuit 285 proceeds via lead 291 to the blanking circuit 253, closing same, and in effect prevents pulses being transferred to the sequencing gates 254 and hence prevents count-down of any of the rings of five, six or seven. Thereby the entire pulse transfer is held in abeyance until the decimal register 282, 281, and 280 can revert to a new registration less than 210.

In our example wherein a total of 787 was fed to the decimal register, it will be apparent that the initial two steps of the ring of five 255 would feed 252 counts to the decimal register and thus the subtraction circuit would be triggered to reduce the register to a reading 42, i.e., would reduce the reading by 210. The ring of six 257 is then allowed to step its one count, adding 175 to the 42 already in the decimal register, leaving a sum of 267 in the register. Again a subtractive cycle is instigated in response to the output from the "AND" circuit 285, reducing the contents of the decade register to 27. Two additional steps of the ring of seven add 240 to the decimal register, bringing the contents to 247, triggering another subtraction cycle and leaving 37 in the decade register. The last count of the ring of seven adds 120 to the register, bringing the register residue to 157, the proper count in decimal notation.

A divide by 8 inverter 251 is employed because the maximum number of pulses per insertion into the decade counter, which must be passed from the clock pulse generator, is seven. In theory a divide by seven inverter might have been used, but a safety factor is provided by employing a divide by eight inverter, at some slight loss in computing speed.

The longest counting interval is involved in transferring the seven counts, corresponding to the output of gate 270, into the decimal register. Since a subtraction cycle, in the system of FIGURE 16, borrows the interval of one mixed-base ring stepping count it can be seen that the entire transfer of the mixed-base word 213 to its decimal equivalent 157 takes a total of 48 primary clock pulse times, plus three subtraction cycles or 72 clock pulse times for complete transfer. This time interval is considerably less than would be involved in direct counting into a decimal register, and becomes of greater, and greater significance as the capacity of the mixed-base computer is increased.

While the circuit of FIGURE 16 utilizes the mixed-base words 100, 010, and 001, for the transfer process, other words might have been used. Additional words which are of value in some cases are of 111, 110, 101, 001. An example of a system which utilizes the words 111, 101, and 001 is provided in the system of FIGURE 17 of the accompanying drawings, and it will become evident that utilization of these words simplifies circuitry and simultaneously speeds up the mixed-base to decimal conversion process.

Figure 17:
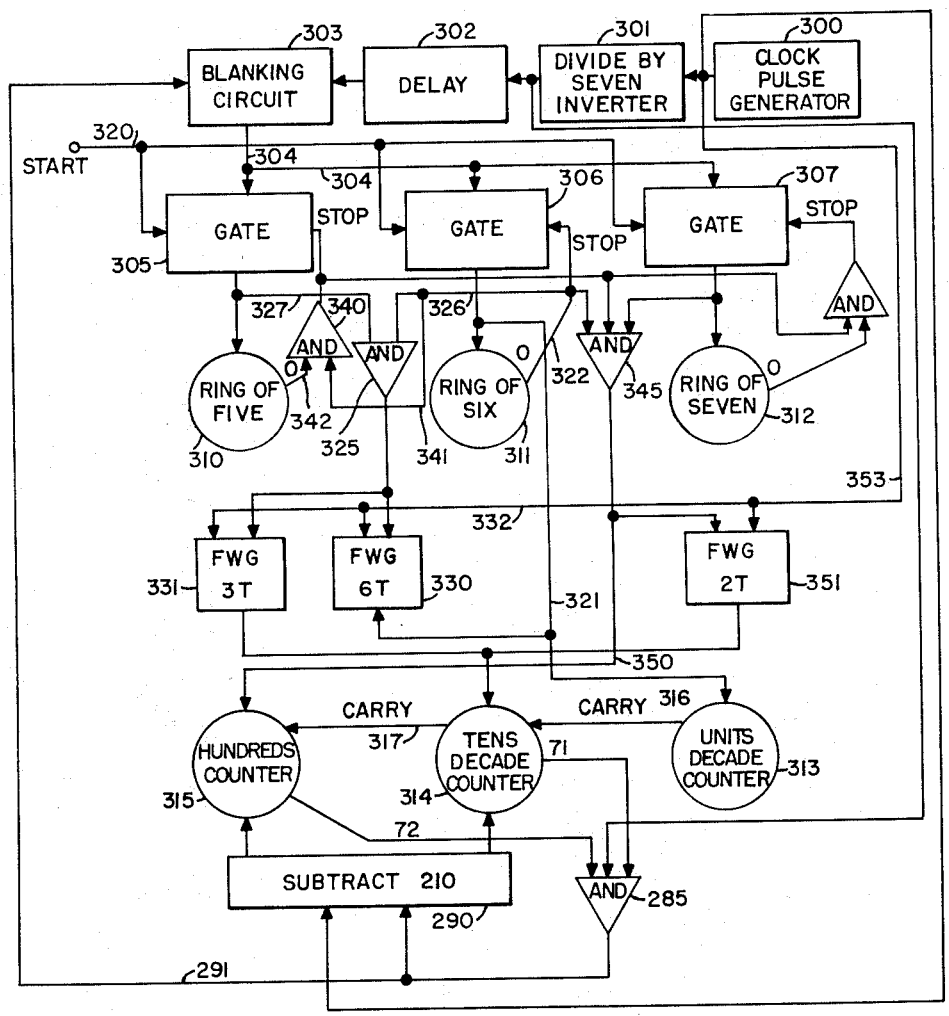
FIGURE 17 is a block diagram of modification of the system of FIGURE 16.

Proceeding now to consideration of FIGURE 17 of the accompanying drawings, the reference numeral 300 denotes a clock pulse generator which provides equally spaced pulses to a divide by 7 inverter 301. It is the function of the inverter to generate one pulse for each seven pulses applied thereto by the clock pulse generator 300, and to invert the polarity of that pulse. The output of the divide-by-7 inverter 301 is applied via a delay line 302 to a normally open blanking circuit or gate 303, the output of which is applied by a lead 304 in parallel to three gates 305, 306, and 307.

There is provided a mixed-base register consisting of a ring of five 310, a ring of six 311 and a ring of seven 312. It is assumed that prior to a conversion operation a predetermined mixed-base number has been inserted into the mixed-base register, and that it is desired to transfer the reading of the mixed-base register into a decimal register in decimal notation, the decimal register including a units decade counter 313, a tens decade counter 314 and a hundreds counter 315, between which is provided appropriate carry circuits 316, 317, to complete a decade register.

Upon application of a start signal or command to the start terminal 320, the several gates 305, 306, and 307, which are normally closed, are opened. Since the gates 305, 306, and 307 are connected in parallel to the output of the blanking circuit 303, pulses are supplied to the gates concurrently, and since the polarity of the pulses has been inverted, the several rings of the mixed-base register step-down simultaneously. Since a step of all rings of a mixed-base register simultaneously is equivalent to subtraction of the word 111 in mixed-base notation, which is in turn to unity in the decimal system, "unit" digit is transmitted by a lead 321 to the units decade counter 313, for each down-stepping pulse applied to the ring of six, 311. The stepping progress continues until the ring of six 311 has reached its zero status, at which time a stop signal is conveyed by a lead 322 to the gate 306, closing same.

Since further pulses transmitted from the blanking circuit 303 will be unable to further reduce the setting of the ring of six 311, gate 306 being closed and that ring being at zero, each additional pulse provided by the blanking circuit 303 is equivalent to subtraction of the mixed-base word 101, i.e., units are subtracted from the rings of 5 and 7, 310 and 312, but nothing is subtracted from the ring of six 311. The decimal equivalent of the mixed-base word 101 is 36. It is desired, therefore, that for each pulse applied to the ring of five and the ring of seven while the ring of six is inoperative, a count of 36 shall be added into the decade register, or that a count of three into the tens decade counter 314, and a count of six into the units decade counter 313. An "AND" circuit 325 is provided, the inputs of which derive from the lead 322 and from the output of the gate 305 via leads 326 and 327, respectively. Accordingly, the "AND" gate 325 is open only while the ring of six is at zero position, and further only when a pulse is provided through the gate 305. "AND" gate 325 issues to a fixed width gate 330, which provides gating pulses equal to 6 clock pulses. Similarly the output of the "AND" gate 325 controls a fixed width gate 331 which in response to each control pulse generates a gate width adequate to pass three clock pulses from clock pulse generator 300, the clock pulses being supplied to the fixed width gates 330 and 331 via a lead 332. The fixed width gate 330 proceeds to the units decade counter 313 while the fixed width gate 331 proceeds to the tens decade counter 314. Accordingly, once the ring of six 311 has been inhibited each pulse provided by the blanking circuit 303 results in insertion of the number 36 in the decimal register.

The process of counting 36 into the decimal register continues until the ring of five 310 reaches the zero state at which time an "AND" circuit 340 is energized at both its inputs, i.e., at one input from the zero position of the ring of six via lead 341 and at its other input directly from the ring of five via lead 342. Output of the "AND" gate 340 is applied to a further "AND" gate 345 at one of its inputs. A further input for the "AND" gate 345 is derived directly from the zero position of the ring of six and still a third input is derived from the output of the ring of seven. Accordingly, the ring of five and the ring of six having been now inhibited, pulses applied from the blanking circuit 303 reach only the ring of seven 312 via the gate 307 and for each such pulse an output appears from the "AND" circuit 345. Thereafter the system operates by subtracting a count of 001 from the mixed-base register, and adding a corresponding count of 120 to the decimal register. Count of 1 to the hundred counter 315 is applied directly from the output of the "AND" gate 345 via lead 350 while the input to the tens decade counter 314 is applied via a fixed width gate 351, which is energized from the output of the "AND" circuit 345 and supplied with counting pulses from the clock pulse generator 300 via a lead 353.

The function of "AND" circuit 285 and subtract 210 circuit 290 has been described in conjunction with the description of FIGURE 16, and remains the same in the system of FIGURE 17. Accordingly, further description thereof is dispensed with.

To illustrate the operation in the system of FIGURE 17 in an actual situation involving members, we may assume that it is desired to transfer the mixed-base word 213 to the decimal equivalent 157. Analysis will show that a total of 21 primary clock pulses is required, for the entire process. Step-by-step analysis shows one pulse transmitted to the units decade counter 313 by the ring of six 311, one step involving the combination of rings 310 and 312 to add 36 to the contents of the decimal register and one count of 120 from the ring of seven 312 to directly yield the desired result.

Figures 18, 19, 22:
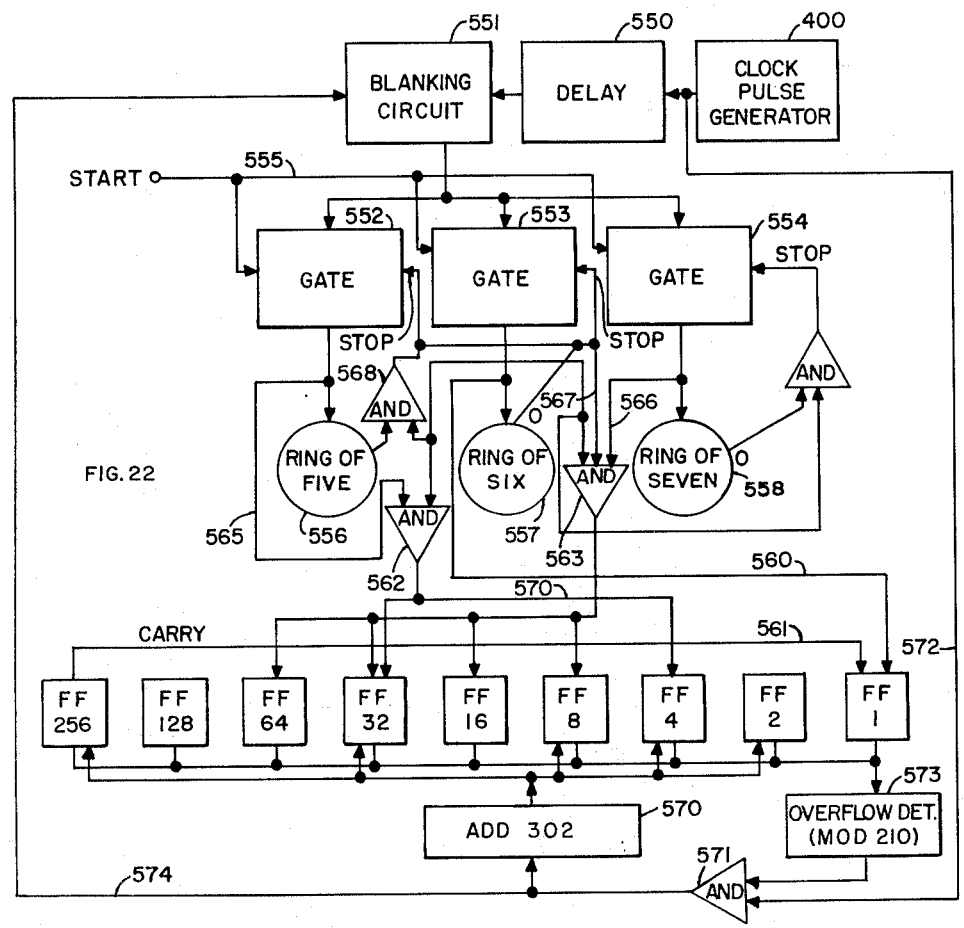
FIGURES 18 and 19 are tables showing the equivalences of certain numbers, mixed modulo base 5, 6, 7 to decimal notation and vice versa, which are significant to conversion of the notations.
FIGURE 22 is a block diagram of a system of mixed-base to binary conversion, employing the principles of FIGURE 20.

It proves desirable in implementing systems of the type of FIGURES 13, 14, or 15, to utilize fixed base words which are equivalent to decimal words, the highest integer of value of which is as low as possible. It is the highest valued rational integer of an equivalent which determines the speed of transfer, since it basically determines the divisor for the circuits such as 301 of FIGURE 15. For example, in the transfer process modulo 5, 6, 7, the mixed-base word 001 is preferable to the word 100, since the highest decimal integer in the expression for 001 is 2, whereas in the alternate case, it is six. Since the mixed base word selected will always be a combination of zeros and ones, it is possible, for any mixed-base system, to plot the possible or available values in the mixed-base system against their decimal values, and thereafter to select the most suitable mixed-base values for utilization in the process. FIGURE 18 of the accompanying drawings provides a plot of possible values which might be employed in a modulo 5, 6, 7 system.

Figure 20:
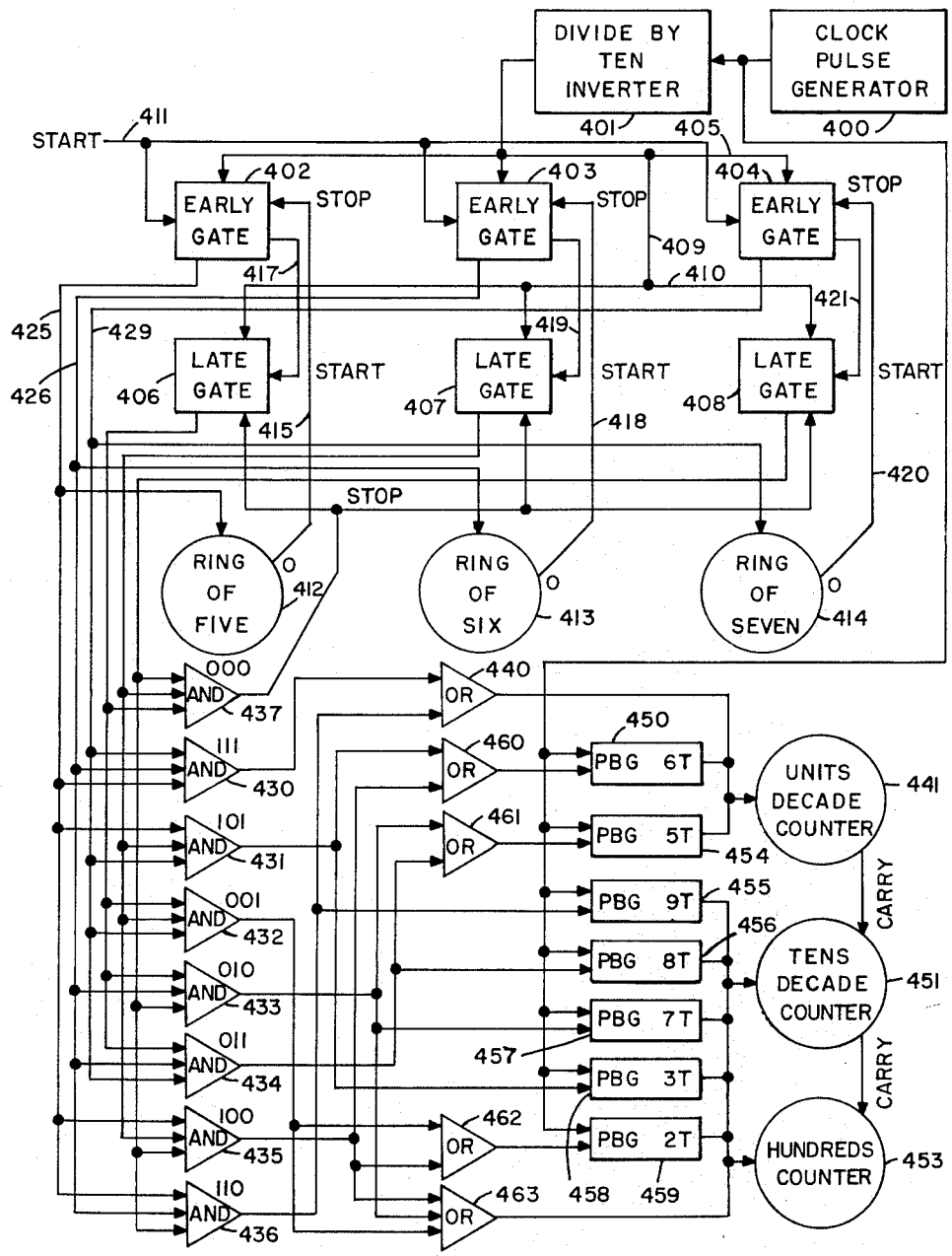
FIGURE 20 is a block diagram of a system for mixed-base to decimal conversion arranged to employ all the significant numbers of FIGURE 18 in converting from mixed-base to decimal notation.

It is further possible to decrease the time of conversion, by utilizing all the available mixed-base words, such as those shown in FIGURE 19. In the system of FIGURE 20 is provided a clock pulse generator 400 which feeds a divide-by-ten inverter 401, the output of which consists of negative or subtractive pulses, one for each ten input pulses provided by the clock pulse generator 400. The output of the divide by 10 inverter 401 is applied to six gates in parallel, three of these gates, denominated early gates, are identified by reference numerals 402, 403, 404 and are supplied via common lead 405. The remaining three gates, denominated late gates, are identified by reference numerals 406, 407, and 408, respectively, and are supplied from lead 405 via leads 409 and 410. Late gates 406, 407, and 408 are normally off and the early gates 402, 403, 404, may be turned on in response to a control or command signal applied to a "start" lead 411.

A number in mixed-base notation is assumed to have been inserted in a mixed base register consisting of a ring of five 412, a ring of six 413 and a ring of seven 414. Zero position of the ring of five 412 proceeds via a stop lead 415 to the early gate 402, stopping the latter when a count of zero has been attained. Stopping of the early gate 402 effects opening of the late gate 415 via lead 417. Similarly the early gate 403 is stopped when ring of six 413 attains a count of zero, via a lead 418, and the corresponding late gate 407 is then opened via lead 419. In a similar manner the early gate 404 is stopped by a lead 420 in response to a zero reading of the ring of seven 413 and at that time a start pulse is applied to the late gate 408 via lead 421.

The early gate 402 issues to the ring of five 412 via lead 425. The early gate 403 issues to the ring of six 413 via lead 426, while the early gate 404 issues to the ring of seven 414 via lead 409. The early gates 402, 403 and 404 and the late gates 406, 407, and 408 may be of the bistable type, i.e., they are stable in either condition, whether open or closed, when set therein by an appropriate signal.

The pulses deriving from the early gates 402, 403, 404 and appearing on leads 425, 426, and 429 are applied not only to the mixed-base register, but also to a series of "AND" gates. The "AND" gates may be identified by the reference numerals 430, 431, 432, 433, 434, 435, and 436, respectively, there being seven such gates. The first gate 430 is fed from the three early gates 402, 403, 404, so that if these are all open, an output pulse will be supplied from the "AND" gate 430, and this output pulse will have a significance in mixed base notation of 111. On the basis that output from an early gate represents a 1 and failure of such output represents a zero, the mixed-base significance of the "AND" gates 430 to 436, taken in order, are 111, 101, 001, 010, 011, 100, and 110, and the connection from the early gates to the "AND" gates are appropriate to these significances. When any given early gate is stopped in response to attainment of its associated mixed-base ring to zero position, the corresponding late gate is opened. The late gates may be assumed to have a value zero, i.e., the opposite significance in binary notation to that provided for the early gates, and the late gates are connected to the "AND" gates 430 to 436, respectively, in suitable relation to provide the zeros in the mixed-base significances above provided for these gates. In addition, a gate 437 is provided which is connected at its input circuits to the three late gates 406, 407, and 408, and therefore output from this gate has the significance 000. It will be perceived that the several "AND" gates 430 to 437, inclusive, are mutually exclusive, i.e., if one provides an output signal, none of the others will do so. The "AND" gate 430, for example, provides output if all of the gates are passing pulses from the divide by 10 inverter 401 while the gate 437 provides signal output if and only if all the late gates are providing output pulses from the divide by 10 inverter 401. In general, the "AND" gates 430 to 437, inclusive, produce output pulses selectively in accordance with the combination of early and late gates which are then providing output pulses, and this in turn is determined by the ten readings of the rings 412, 413, 414 of the mixed-base register, or more specifically, in accordance with the locations of the zero readings in that register.

Assuming that the mixed-base register is filled with a mixed-base word, there being no zero digits in that word, secondary clock pulses will appear at the outputs of all three early gates 402, 403, 404, and accordingly output pulses will be derived from the "AND" gate 430 having a significance 111. Signal from this "AND" gate will be applied to the "OR" gate 440 which in turn supplies one pulse per secondary clock pulse to the units decade counter 441. The process of routing unitary pulses to units decade counter 441 continues until such time as one of the rings of the mixed-base register attains a count of 0, at which time the corresponding early gate is stopped and the corresponding late gate is opened. If zero was attained in only one of the rings of the mixed-base register, one of the "AND" gates 431, 434, or 436 is activated (since the significances of these "AND" gates are 101, 011, and 110), and specifically that one will be activated which corresponds in its zero position with the inactivated one of the early gates, or with that ring of the mixed-base register which has been returned to zero.

Assume for example, that the ring of six 413 was stepped to zero before either of the remaining rings was stepped to zero. In such case the gate 431, having a significance 101, will become the active "AND" gate and will pass one pulse for each secondary clock pulse, to "OR" gate 460. The latter activates a burst pulse generator 450, which generates six pulses per secondary clock pulse applied thereto. These are applied to the units decade counter 441. Simultaneously, the output of "AND" circuit 431 steps the tens decade counter 451, three pulses for each secondary clock pulses by means of a burst pulse generator 458. It may be perceived by reference to FIGURE 20a that the number 36 is the equivalent decimal step for the mixed-base value 101.

The process of adding 36's continues until at least one of the remaining rings is stepped to zero. The numbers of steps transmitted to the decimal register, consisting of units decade counter 441, tens decade counter 451 and hundreds decade counter 453 are determined at any particular time by the combination of early and late gates which are active, since these determine which ones of the "AND" circuits will be activated. The several "AND" circuits are connected to control burst pulse generators 450, 454, 455, 456, 457, 458, and 459, which provide pulse bursts of 6, 5, 9, 8, 7, 3, and 2 pulses, respectively, in response to each input secondary pulse. Where two different "AND" gates are required to activate the same pulse generator, they may do so via appropriate ones of "OR" gates 440, 460, 461, 462, and 463.

The system of FIGURE 20 yields the great advantage of completely transferring the contents of the mixed-base register to the decade register within a number of secondary clock pulses equal to one less than the largest mixed-base modulo in the system. Thus, in the example provided hereinabove, the entire mixed-base to decimal transfer will in the worst case consume only six secondary pulses, and the average case will require approximately three secondary clock pulses. Additionally, it will be noted that the system of FIGURE 20 does not require gross modulo correction of the decimal registers, since the stepping pulses as seen by the decimal register will, in the example illustrated, always be less than the decimal number 210, representing the maximum mixed-base number available to the system by reason of the moduli selected.

The technique of FIGURE 20 is applicable for the conversion of a mixed-base number (of a given set of moduli), to a set of numbers in a common base, or to a set of numbers congruent to different moduli. Although burst pulse generators have been shown in the system of FIGURE 17, it will be clear that the pulses supplied to the decade rings may take the forms of fixed width gates, in which case a clock pulse generator or any other form of device may be employed which produces a desired plurality of pulses when triggered by a single input pulse.

Figure 21:
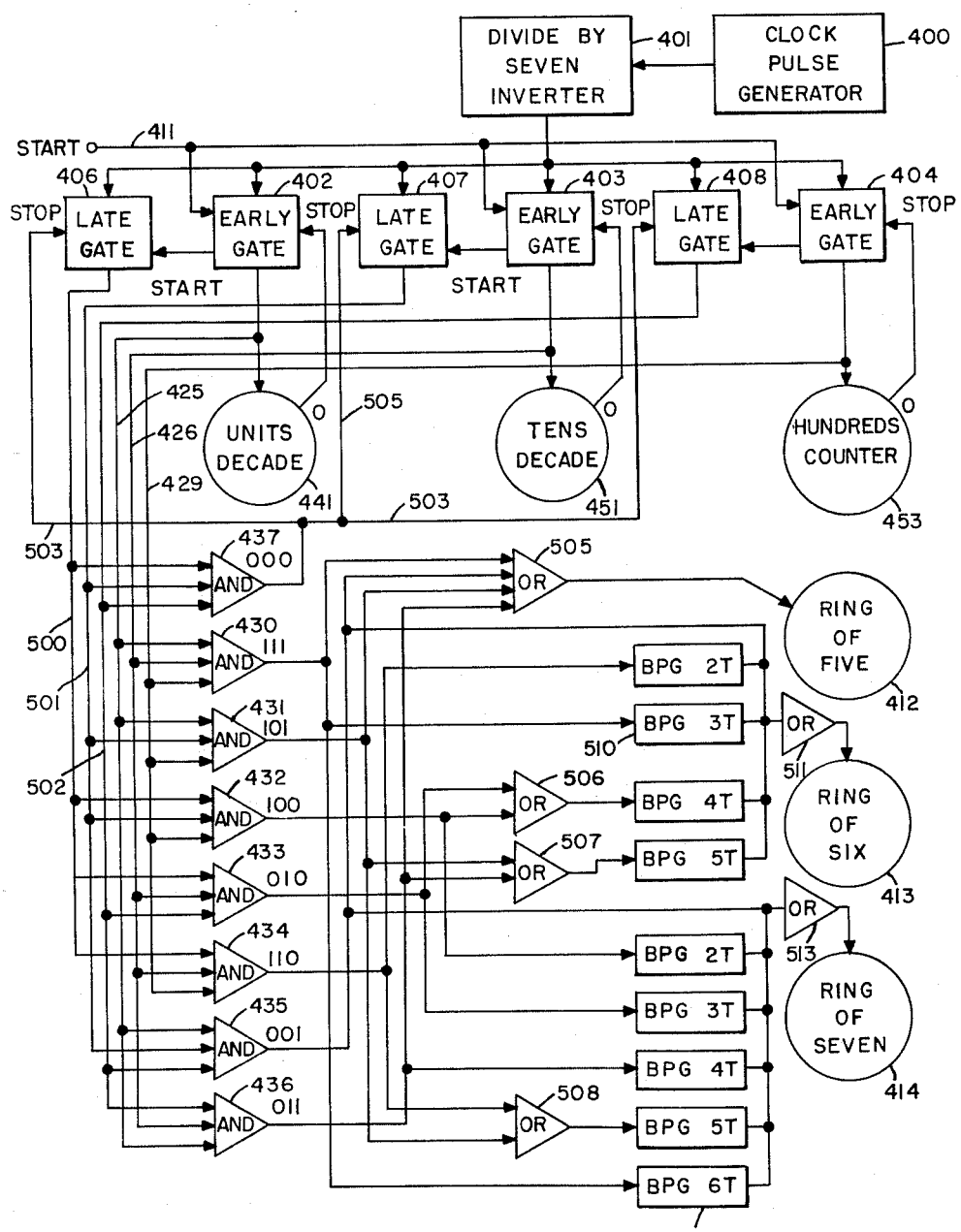
FIGURE 21 is a block digaram of a system for decimal to mixed-base conversion, employing the principles of FIGURE 20.

Reference is now specifically made to the system of FIGURE 21, which represents a modification of the system of FIGURE 10, employing the general principles of that system, but modified to provide for conversion of decimal to mixed-base notation instead of mixed-base to decimal notation. In view of the similarity of the system of FIGURES 21 and 22 corresponding elements in the two systems have been identified by duplicate reference numerals.

It is assumed in the system of FIGURE 21 that a number has been inserted in the decade register comprising units decade counter 441, tens decade counter 451 and hundreds decade counter 453, and that it is desired to convert this number to a mixed-base number, modulo 5, 6, 7, in a mixed-base register comprising a ring of five 412, a ring of 6, 413, and a ring of 7, 414.

Insertion of a start signal on the start lead 411 opens the early gates 402, 403, and 404, and permits transfer of clock pulses from the clock pulse generator 400 to divide by 7 inverter circuit 401, and thence to the units decade counter 441, the tens decade counter 451 and the hundred decade counter 453, respectively. The output of early gate 402 proceeds to a lead 425, the output of the early gate 403 proceeds to a lead 426 and the output of the early gate 404 proceeds to a lead 429. Similarly, the output of late gate 406 proceeds to a lead 500, the output of the late gate 407 proceeds to a lead 501 and the output of the late gate 408 proceeds to a lead 502. Each early gate is connected with a different one of the decade counters, and specifically with the zero position of the latter, so that upon attainment of that zero position the early gate is stopped or blocked and a start pulse transfers to the associated late gate. In the case of the system of FIGURE 21, the early gate 402 is associated with the units decade counter 441 and the late gate 406, the tens decade counter 451 is associated with the early gate 403 and the late gate 407 and the hundred decade counter 453 if associated with the early gate 404 and the late gate 408. It follows that pulses will be transmitted selectively to the leads 425, 426, 429, 500, 501, 502, according to the reading of the several decade counters, i.e., according to whether each of these reads zero or not zero. If a given decade reads not zero, its early gate is open, while if it reads zero, its late gate is open. Giving the significance unity to an open early gate and the significance 0 to an open late gate, leads 425, 426, 429, 500, 501, 502 are connected to a series of "AND" gates 430 to 437, inclusive, in such fashion that the outputs of these "AND" gates have the significances 111, 101, 100, 010, 110, 001, 011, 000, respectively. For example, the "AND" gate 430 is supplied with pulses from the leads 425, 426, 429, and accordingly an output pulse from this AND gate indicates that the three early gates 402, 403, 404, are open, and accordingly that none of the decade counters have attained the count of zero. On the other hand the "AND" gate 437 is connected simultaneously with the leads 500, 501, and 502, so that an output from this AND gate indicates that all the late gates are being supplied by pulses, which can occur only when all these decade counters have been returned to zero. The "AND" gate 437 is connected via lead 503 to all the late gates 406, 407, and 408, and delivers thereto a stop pulse, which indicates termination of an entire operation. The remaining gates are connected to a series of "OR" circuits 505, 506, 507, 508, which in turn control burst pulse generators, which in turn control actuation of the mixed-base register.

For example, the "OR" gate 505 delivers pulses directly to a ring of five 412, and the "OR" gate 507 delivers pulses to a burst pulse generator which delivers five timing pulses to the ring of six 413. It will also be observed that various of the "AND" gates 430 to 436, respectively, deliver control pulses directly to a series of burst pulse generators, which in turn supply pulses to the ring of five, 412, the ring of six, 413, or to the ring of 7, 414. The "OR" circuits 505, 506, 507, 508, inclusive, are utilized where more than a single one of the "AND" gates 430 to 436, inclusive, are to supply signals to a ring of five, six or seven or to a burst pulse generator.

Referring to FIGURE 21 of the accompanying drawings, it will be observed that stepping down of each decade counter by zero results in no insertion of counts in the mixed-base register. This is accomplished in the system of FIGURE 22 since the 000 "AND" gate is not connected to the mixed-base register.

Reduction of the decimal register by 111 requires insertion of 1-3-6 into the mixed-base register. "AND" gate 430 is then energized, which indicates that none of the decades reads zero. Gate 430 supplied one pulse to the ring of five, 412 via "OR" gate 505, 3 pulses to ring of six 413 via burst generator 510 and "OR" gate 511, and 6 pulses to ring of seven 414 via burst pulse generator 512 and "OR" gate 513. The inserted mixed-base number is thus 136.

Each position of the decimal counters 441, 451, 453 is sensed on each step down, the appropriate one of "AND" gates 430 to 437 inclusive, passes a control pulse, and appropriate bursts of pulses are then transferred to the mixed-base register, conforming with the conversion chart of FIGURE 19.

Eventually, all the decades are returned to zero, when the 000 gate 437 transfers "stop" pulses to all the late gates, 406, 407, 408, terminating the operation.

The system of FIGURE 22 of the accompanying drawings illustrates implementation of a system for conversion from mixed-base to binary notation. A clock pulse generator 400 is provided, the output of which proceeds via a delay device 550 and a blanking circuit "OR" gate 551, in parallel to a series of gates 552, 553, and 554. The gates may be opened in response to a control or command pulse applied to a start lead 555. The gate 552 connects with a ring of five, 556, the gate 553 connects with a ring of six 557, and the gate 554 with a ring of seven 558, the polarities of the pulses applied via the gates to the rings of the mixed-base register being in subtractive relation, so that a previously inserted number may be reduced in unit steps to a count of 000.

If it is assumed that the mixed-base register contains a count, none of the digits of which is zero, each clock-pulse will step each ring of the mixed-base register down by one unit. The output of the gate 553 in such case proceeds directly via lead 560 to the first flip-flop of a binary ring comprising flip-flops FF1, FF2, FF4, FF8, FF16, FF32, FF64, FF128, and FF256, there being a carry back lead between the flip-flop FF 256 and the flip-flop FF1, and a carry forward lead between each flip-flop of a lower order to a flip-flop of a higher order, in a manner which is, per se, conventional and usual in the art of counting in the binary number system.

It follows that, while the mixed-base register includes numbers greater than zero in each of its rings, counts of one are inserted in the binary counter as count-downs of one are applied in parallel to the several rings of the mixed-base register.

Should the ring of six 557 arrive at zero, while the rings of five and seven contain digits greater than zero, it becomes necessary thereafter to insert the decimal word 36 into the binary register. The zero position of the ring of six 557 applies signals to "AND" gates 568, and the latter to "AND" gate 563. The "AND" gate 562 is further energized from the output of the gate 552, the "AND" gate 563 is energized from the output of the gate 554 via lead 566. The "AND" gate 563 requires, however, a third input on lead 567, which is not available since it must be derived from "AND" gate 568, which in turn requires that the ring of five be set back to zero. Accordingly, no output is derivable from the "AND" gate 563.

The "AND" gate 562, on the other hand, supplies output pulses to a lead 570, and these pulses proceed to a flip-flop FF4 and to a flip-flop FF32, so that a count of 36 is inserted in the binary counter.

Should only the ring of five have a count of zero, while the ring of six and the ring of seven have not, the gate 553 would remain open, and pulses would continue to be supplied to FF1 via lead 560. This is required since the decimal number 85 requires to be inserted in the binary register when only the ring of five has obtained a count of zero. Insertion of units into the binary register leaves 84 to be inserted for each clock pulse. The "AND" gate 568 does not pass signal, since it requires that the ring of six return to zero. "AND" gate 562 does not pass pulses since it requires output from the gate 552, which are unavailable when the ring of five obtains a count of zero. Hence, the binary register counts back by units.

Output from "AND" gate 563 triggers flip-flops FF8, FF16, FF32, and FF64, for a count of 120. Triggering of these flip-flops on energization of "AND" gate 563 requires that the ring of six and the ring of five be set at zero simultaneously, i.e., the count by reference to FIGURE 18a is 001.

While three other control words are available, i.e. 010, 011, 100, and 110, none of these are employed in the system illustrated. This is not to say that by proper arrangement of the "AND" gates and the outputs thereof, certain of these words might not be used, but merely that in the example provided they have been avoided.

The binary register is, per se, a register to a count of 512. By introducing back carry from the FF256 flip-flop to the FF1 flip-flop via lead 561, however, the binary register becomes a cyclic register of count 512. An "ADD" 302 circuit 570 is provided, which supplies pulses to the flip-flops FF2, FF4, FF8 and FF32, for a count of 302. The "ADD" 302 circuit 570 is energized from an "AND" gate 571, which is in turn energized from a clock-pulse generator 500 directly via lead 572 and from an overflow detector, modulo 210, 573. In effect, whenever the overflow detector 573 detects that a count greater than 210 has been inserted in the binary register, it supplies the necessary signal to the "AND" gate 571 to energize the "AND" circuit 570 and to add 302 to the contents of the binary register. Addition of 302 to the contents of the binary register is equivalent to subtraction of 210, since 302 plus 210 equals 512. While the addition of 302 is taking place, a control pulse is applied from the "AND" circuit 571 via lead 574 to the blanking circuit 551, to prevent simultaneous reduction of count from the mixed-base register. As soon as the add 302 command has been complied with, however, the 210 overflow detector 573 becomes inactive, and the blanking circuit is again open to permit transfer of clock pulses to the mixed-base register.

While I have described and illustrated several embodiments of my invention, it will be clear that variations of the general arrangement and of the details of construction which are specifically illustrated and described may be resorted to without departing from the true spirit and scope of the invention as defined in the appended claims.

What I claim is:

1. In a system for subtracting a first number from a second number, both said numbers being in identical mixed-base notation classes, a mixed-base register comprising a plurality of ring counters congruent to different relatively prime moduli, each of said ring counters arranged and adapted to count additively in response to pulses of one polarity and subtractively in response to pulses of opposite polarity, means for supplying said pulses of one polarity to said ring counters in number sufficient to insert said second number, a pulse polarity inverting circuit, and means for supplying said pulses of one polarity indicative of said first member to said ring counters via said polarity inverting circuit in quantity sufficient to subtract said first number.

2. A system of multiplication in mixed-base notation, comprising a first mixed-base register, a second mixed-base register, means for inserting a multiplier mixed-base number in said first mixed-base register, means for inserting a multiplicand mixed-base number in said second mixed-base register, a product mixed-base register, and means for non-destructively reading out the contents of said multiplicand mixed-base register into said product mixed-base register a number of times equal to the contents of said multiplier mixed-base register.

3. In a computer, a ring counter modulo $m$, a plurality of pulse input terminals for application in parallel of number of pulses equal to the integers of a multiple digit decimal number, a pulse coder system connected in cascade with said ring counter modulo $m$ for converting each pulse applied to each input terminal to a number of pulses according to the formula $x \equiv a \mod m$, where $x$ is the number of pulses, and $a$ is the decimal position of the integer in the decimal number.

4. An additive system for mixed-base notation, comprising a first ring counter modulo $m$, a second ring counter modulo $n$, a plurality of "AND" gates each having two inputs and an output, means connecting said inputs to sense the concurrence of different pairs of readings set into said first and second ring counters and a plurality of "OR" circuits connected to said outputs arranged for deriving from said outputs a reading congruent modulo $m$ with the sum of the readings of said first and second ring counters.

5. A multiplicative system, comprising a first ring counter modulo $m$, a second ring counter modulo $n$, where $m$ and $n$ are integral members, a plurality of "AND" gates each having two inputs and an output, means connecting said inputs to sense the concurrence of possible different pairs of readings of said first and second ring counters, and a plurality of "OR" gates connected to said outputs and arranged for deriving from said outputs a reading congruent modulo $m$ with the product of the readings of said first and second ring counters.

6. In a system for converting a count in a mixed-base register having plural counters with relatively prime moduli to a decimal count in a decimal register, means for stepping down the counts of said counters one at a time until said mixed-base counters are all returned to zero, and means responsive to each of said count downs for inserting in said decimal register the decimal equivalent of the count down.

7. In a system for converting from mixed-base to weighted notation, a mixed-base register having a plurality of ring counters employing different relatively prime moduli without carry between ring counters a further register including a plurality of ring counters of weighted orders, said further register including carry circuits from ring counters of lower to ring counters of next higher order, means for changing the reading of said mixed base register toward a total zero reading in steps of one unit per counter for fewer than all of said counters simultaneously, each said change of reading having a numerical equivalent in the notation of said further register, and means for inserting said numerical equivalent into said further register in response to each of said changes of reading.

8. In a system for converting one to the other of a register reading in mixed-base notation and a register reading in a notation wherein $N = C_0 + C_1 n + C_2 n^2 \ldots$ where $N$ is the last mentioned reading, where $C_0, C_1, C_2$, are integers, where $n$ is a number, and where $C_0, C_1, C_2$ having a maximum value $n-1$, wherein each of said registers includes a plurality of ring counters, means for changing the readings of all the counters of one of said registers by unity until at least one of said counters reads zero, means for thereafter changing the readings of the non-zero reading counters of said one of said registers by unity until at least a further one of said counters reads zero, and means for reading into the other of said registers values equal to the changes in value of the readings of said one register concurrently with each operation of said means for changing the reading of the counters of said one register.

9. In a system for converting a first register reading in one number system to a second register reading in another and different number system, each of said registers having a plurality of ring counters, means for simultaneously decreasing the reading of the ring counters of said first register each by a step having a value selected from the values zero and unity, means for increasing the readings of the counters of said second register in steps by values in said another number system equal to the values of the decreasing steps of said first register in response to each operation of said means for decreasing, and means for terminating the operation of said means for decreasing only for each counter of said first register which has attained a count of zero.

10. In a system for converting a first register reading in one number system to a second register reading in a second and different number system, each of said registers having a plurality of ring counters, comprising means for stepping back by units ring counters of said one register to zero and means responsive to each stepback of a ring of said one register for adding into said second register an amount equal to the change in value in the reading of said one register resulting from the stepback in said another and different number system.

11. In a system for converting a first register reading in a first number system to a second register reading in a second and different number system, each of said registers including a plurality of ring counters, comprising first means for sensing whether or not the ring counters of said first register all read greater than zero, second means responsive to said first means when the ring counters of said first register all read greater than zero, for decreasing the reading of said first register in steps by units until at least one of said ring counters of said first register read zero, and with each step adding a unit to said second register, means for inserting decreases in readings of only those ring counters of said first register which read greater than zero by unit steps after one or more of the said ring counters of said first register have attained zero readings, and increasing the readings of said second register by amounts equal in said second number system to the value of said last-mentioned decreases of readings in the first number system.

12. In a system for converting a first register reading in a first number system to a second register reading in a second number system, each of said registers having a plurality of ring counters, comprising means for stepping back toward zero by units the readings of all the ring counters of said first register which read greater than zero, means for sensing which of said ring counters of said first register are stepped back on each operation of said means for stepping back, and means responsive to said means for sensing for inserting in said second register a number equal to the value in said second number system of the change in reading of said first number system for each stepback toward zero.

13. In a system for converting between mixed-base notation and other weighted notation, a mixed-base register having a plurality of ring counters employing relatively prime moduli and no carry between ring counters, a further register including a plurality of ring counters all having the same modulus but different weights, means for changing the reading of one of said registers by steps of not more than one per ring counter for all the ring counters of said one of said registers for each of said steps, each of said steps having a numerical equivalent in the notation of said further register, and means for inserting said numerical equivalent into said further register in response to each change of reading of said one of said registers.

14. A mixed-base register comprising a first ring counter having a maximum reading $m$, a second ring counter having a maximum reading $n$, where $m+1$ and $n+1$ are relatively prime, and means for changing the readings of said counters each by a value greater than its maximum reading without carry from one of said ring counters to the other of said ring counters.

15. In a mixed-base computer a ring of 9, means for inserting units, tens and hundreds counts into said ring of nine, said means for inserting units counts consisting of means for inserting one pulse per unit of said units count, means for inserting tens into said ring of nine, said means for inserting tens consisting of means for inserting one pulse for each of said tens count, and means for inserting hundreds into said ring of nine including means for inserting one pulse for each hundred of said hundreds count.

16. In a mixed-base register comprising a ring of ten, means for inserting into said ring of ten a number of pulses equal to the number of units in a decimal number, a number of pulses equal to the number of tens in said decimal number, and a number of pulses equal to the number of hundreds in said decimal number.

17. In a mixed-base computer, a ring counter having a maximum count of ten starting with zero, said ring counter being arranged and adapted to count additively in response to pulses of one polarity and subtractively in response to pulses of opposite polarity, a source of first pulses equal in number to the units of a decimal number, a source of second pulses equal in number to the tens of said decimal number and a source of third pulses equal in number to the hundreds of said decimal number, said pulses having one polarity, means for applying said first pulses directly to said counter, means for applying said third pulses directly to said counter, a polarity inverter, and means for applying said second pulses to said ring counter via said polarity inverter.

18. A system of multiplication in mixed-base notation comprising a first mixed-base register having a plurality of ring counters each congruent to a different modulus, said moduli being relatively prime, a second mixed-base register having a corresponding plurality of ring counters, means for inserting a multiplier mixed-base number into said first mixed-base register, means for inserting a multiplicand in said second mixed-base register, a product mixed-base register having a number of counters corresponding one for one for the counters of said first and second mixed-base registers, and means for non-destructively reading out the contents of said multiplicand mixed-base register into said product mixed-base register a number of times equal to the contents of said multiplier mixed-base register by reading out the contents of each ring counter congruent to a given modulus in said multiplicand register a number of times equal to the reading of the ring counter of said multiplier register having that same modulus into the ring counter of said product mixed-base register having the same modulus.

19. In a system for converting a count in a mixed-base register having plural counters with relatively prime moduli and no carry between counters, to a binary count in a binary register, means for stepping down by successive counts of one the counts of each counter of said mixed-base register till said mixed-base counters are all returned to zero, and means responsive to each of said count-downs for inserting into said binary register the decimal equivalent of the count-downs.

20. In combination, a first counter responsive to a first signal and having a maximum count of $m-1$, a second counter responsive to a second signal and having a maximum count of $n-1$, where $m$ and $n$ are relatively prime numbers, and where said first and second counters are each arranged and adapted to count in response to one of said first and second signals only from zero through maximum count in successive cycles each without carry from the other, and modulo $m$ and $n$, respectively, whereby said counters provide a count in mixed-base notation, modulo $m$ and $n$.

21. The combination according to claim 20, wherein is provided means for multiplying the count of each of said counters by the same number in decimal notation whereby the count of said counters in mixed-base notation, modulo $m$ and $n$ is multiplied by said number in decimal notation.

22. The combination according to claim 20, wherein is provided means for adding to the count of each of said counters the same decimal number, whereby the count of said counters in mixed-base notation, modulo $m$ and $n$, is increased by said decimal number.

23. The combination according to claim 20, wherein is provided means for subtracting from the count of each of said counters the same decimal number, whereby the count of said counters in mixed-base notation, modulo $m$ and $n$, is decreased by said decimal number.

24. The combination according to claim 20, wherein is provided means for adding to the count of said counters a mixed-base number modulo $m$ and $n$, equivalent to a given decimal number, whereby the count of said counters in mixed-base notation, modulo $m$ and $n$, is increased by the given decimal number.

25. The combination according to claim 20, wherein is provided means for multiplying the count of said counters by a mixed-base number modulo $m$ and $n$, said last named mixed-base number having a decimal equivalent $a$, whereby the count of said counters is increased by a factor equal to $a$.

26. In a system for converting a number expressed in one of mixed-base notation and weighted-base notation to a number expressed in the other of the notations, a first register having a number of uncascaded ring counters each congruent to a different modulus, the moduli being relatively prime, a second register having a number of cascaded ring counters, means for inserting a reading into one of said registers in the notation of that register, means for transferring said reading to the other of said registers in the notation of the latter register, said last means including means for changing the reading of said one of said registers in successive steps toward zero until said one of said registers reads zero, and means responsive to each change in the reading of said one of said registers for modifying the reading of the other of said registers in accordance with a value equal to said change in the notation of the other of said registers.

27. The combination according to claim 26 wherein is provided means for selecting said successive steps from a plurality of available and possible steps in accordance with the reading of said one register when selection is made.

28. The system according to claim 27, wherein said one of said registers is the mixed-base register.

29. The system according to claim 27, wherein said other of said registers is the mixed base register.

30. The system according to claim 27, wherein said one of said registers is a mixed-base register, and the other of said registers is a binary register.

31. The system according to claim 27, wherein one of said registers is a decimal register.

References Cited in the file of this patent

UNITED STATES PATENTS

| | | |
|---|---|---|
| 2,403,873 | Mumma | July 9, 1946 |
| 2,485,825 | Grosdoff | Oct. 25, 1949 |
| 2,626,751 | Mullarkey | Jan. 27, 1953 |
| 2,647,997 | Williams | Aug. 4, 1953 |
| 2,773,983 | Baker et al. | Dec. 11, 1956 |
| 2,774,534 | Dunn | Dec. 18, 1956 |
| 2,800,278 | Thomas | July 23, 1957 |
| 2,860,831 | Hobbs | Nov. 18, 1958 |
| 2,896,848 | Miehle | July 28, 1959 |